(12) United States Patent  
Warther

(10) Patent No.: US 8,585,852 B2  
(45) Date of Patent: *Nov. 19, 2013

(54) METHODS OF MAKING PRINTED PLANAR RADIO FREQUENCY IDENTIFICATION ELEMENTS

(75) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/052,576

(22) Filed: Mar. 21, 2011

(65) Prior Publication Data

US 2011/0226857 A1    Sep. 22, 2011

Related U.S. Application Data

(63) Continuation-in-part of application No. 11/735,891, filed on Apr. 16, 2007, now Pat. No. 7,909,955, which is a continuation of application No. 11/099,998, filed (Continued)

(51) Int. Cl.
    *B32B 37/00*    (2006.01)

(52) U.S. Cl.
    USPC ............ 156/257; 156/227; 156/268; 156/277; 156/292; 156/300; 156/208.4; 156/323

(58) Field of Classification Search
    USPC ......... 156/227, 292, 257, 268, 277, 300, 323, 156/308.4; 340/572.1, 572.3, 572.8; 342/51
    See application file for complete search history.

(56) References Cited

U.S. PATENT DOCUMENTS 3,609,858 A * 10/1971 Shaw .............................. 29/604  
4,157,540 A    6/1979 Oros (Continued)

FOREIGN PATENT DOCUMENTS

WO    8404493 A1    11/1984  
WO    8907052 A1    8/1989

(Continued)

OTHER PUBLICATIONS

Office Action issued Aug. 8, 2012 in U.S. Appl. No. 11/967,502.

(Continued)

*Primary Examiner* — Linda Gray  
(74) *Attorney, Agent, or Firm* — Panitch Schwarze Belisario & Nadel LLP

(57) ABSTRACT

A method includes steps of: encapsulating at least a first passive radio frequency identification transponder assembly between two plies of flexible porous planar polymer material intimately bonded together around the assembly, each ply being microvoided substantially uniformly throughout, to form a multilayer planar core; and scoring the multilayer core to define at least a first multilayer, integral, individual planar radio frequency identification element including the first passive radio frequency identification transponder assembly separable from a remainder of the core. The encapsulating step may further include encapsulating a second passive radio frequency identification transponder assembly with the first between the plies.

28 Claims, 16 Drawing Sheets

Related U.S. Application Data

(63) on Apr. 6, 2005, now Pat. No. 7,204,652, which is a continuation-in-part of application No. 10/279,752, filed on Oct. 23, 2002, now Pat. No. 6,994,262, and a continuation-in-part of application No. 09/595,825, filed on Jun. 16, 2000, now abandoned, application No. 13/052,576, which is a continuation-in-part of application No. 09/532,113, filed on Mar. 21, 2000, now Pat. No. 6,769,718, and a continuation-in-part of application No. 12/951,749, filed on Nov. 22, 2010, and a continuation-in-part of application No. 11/967,502, filed on Dec. 31, 2007, and a continuation-in-part of application No. 12/960,941, filed on Dec. 6, 2010, and a continuation-in-part of application No. 12/416,637, filed on Apr. 1, 2009, now Pat. No. 7,845,569.

(60) Provisional application No. 60/401,789, filed on Aug. 7, 2002, provisional application No. 60/139,684, filed on Jun. 16, 1999, provisional application No. 61/263,186, filed on Nov. 20, 2009, provisional application No. 60/882,623, filed on Dec. 29, 2006, provisional application No. 61/301,411, filed on Feb. 4, 2010, provisional application No. 61/041,454, filed on Apr. 1, 2008, provisional application No. 60/559,789, filed on Apr. 6, 2004.

(56) References Cited

U.S. PATENT DOCUMENTS

| | | | |
|---|---|---|---|
| 4,212,393 A | | 7/1980 | Lenkoff |
| 4,333,072 A | | 6/1982 | Beigel |
| 4,549,264 A | | 10/1985 | Carroll et al. |
| 4,560,445 A | | 12/1985 | Hoover et al. |
| 4,578,572 A | | 3/1986 | Hice |
| 4,598,275 A | | 7/1986 | Ross et al. |
| 4,658,357 A | | 4/1987 | Carroll et al. |
| 4,682,415 A | | 7/1987 | Adell |
| 4,694,283 A | | 9/1987 | Reeb |
| 4,717,177 A | | 1/1988 | Boram |
| 4,717,438 A | * | 1/1988 | Benge et al. ............ 156/152 |
| 4,807,908 A | | 2/1989 | Gerbel |
| 4,851,815 A | | 7/1989 | Enkelmann |
| 4,861,644 A | | 8/1989 | Young et al. |
| 4,973,944 A | | 11/1990 | Maletta |
| 4,978,146 A | | 12/1990 | Warther et al. |
| 5,020,581 A | * | 6/1991 | Gutierrez ................ 162/103 |
| 5,032,823 A | | 7/1991 | Bower et al. |
| 5,106,124 A | | 4/1992 | Volkman et al. |
| 5,115,223 A | | 5/1992 | Moody |
| 5,166,501 A | * | 11/1992 | Woolley ................ 235/488 |
| 5,218,343 A | | 6/1993 | Stobbe et al. |
| 5,233,167 A | | 8/1993 | Markman et al. |
| 5,340,968 A | | 8/1994 | Watanabe et al. |
| 5,366,249 A | | 11/1994 | Diemert |
| 5,381,137 A | | 1/1995 | Ghaem et al. |
| 5,430,441 A | | 7/1995 | Bickley et al. |
| 5,444,223 A | | 8/1995 | Blama |
| 5,446,447 A | | 8/1995 | Carney et al. |
| 5,448,110 A | | 9/1995 | Tuttle et al. |
| 5,478,991 A | | 12/1995 | Watanabe et al. |
| 5,492,558 A | | 2/1996 | Miller et al. |
| 5,493,805 A | | 2/1996 | Penuela et al. |
| 5,495,981 A | | 3/1996 | Warther |
| 5,497,140 A | | 3/1996 | Tuttle |
| 5,503,665 A | | 4/1996 | Miller et al. |
| 5,512,879 A | | 4/1996 | Stokes |
| 5,528,222 A | | 6/1996 | Moskowitz et al. |
| 5,529,345 A | | 6/1996 | Kohls |
| 5,531,482 A | | 7/1996 | Blank |
| 5,560,970 A | * | 10/1996 | Ludeb uhl ................ 428/41.9 |
| 5,574,470 A | | 11/1996 | de Vall |
| 5,581,257 A | | 12/1996 | Greene et al. |
| 5,609,716 A | | 3/1997 | Mosher, Jr. |
| 5,615,504 A | | 4/1997 | Peterson et al. |
| 5,624,514 A | * | 4/1997 | Frowein ................ 156/148 |
| 5,646,592 A | | 7/1997 | Tuttle |
| 5,660,663 A | * | 8/1997 | Chamberlain et al. ........ 156/152 |
| 5,682,143 A | | 10/1997 | Brady et al. |
| 5,708,419 A | | 1/1998 | Isaacson et al. |
| 5,719,586 A | | 2/1998 | Tuttle |
| 5,743,567 A | | 4/1998 | Warther |
| 5,769,457 A | | 6/1998 | Warther |
| 5,776,278 A | | 7/1998 | Tuttle et al. |
| 5,781,110 A | | 7/1998 | Habeger, Jr. et al. |
| 5,799,426 A | | 9/1998 | Peterson |
| 5,838,253 A | | 11/1998 | Wurz et al. |
| 5,863,016 A | | 1/1999 | Makwinski et al. |
| 5,863,076 A | | 1/1999 | Warther |
| 5,883,576 A | | 3/1999 | De La Huerga |
| 5,912,981 A | | 6/1999 | Hansmire et al. |
| 5,935,308 A | | 8/1999 | Siddiqui et al. |
| 5,939,181 A | | 8/1999 | Kumano et al. |
| 5,963,134 A | | 10/1999 | Bowers et al. |
| 5,973,598 A | | 10/1999 | Beigel |
| 5,973,600 A | | 10/1999 | Mosher, Jr. |
| 5,979,941 A | | 11/1999 | Mosher, Jr. et al. |
| 5,997,042 A | | 12/1999 | Blank |
| 6,010,159 A | | 1/2000 | Warther |
| 6,039,356 A | | 3/2000 | Warther et al. |
| 6,050,622 A | | 4/2000 | Gustafson |
| 6,078,791 A | | 6/2000 | Tuttle et al. |
| 6,089,611 A | | 7/2000 | Blank |
| 6,124,377 A | | 9/2000 | Kaiser et al. |
| 6,144,303 A | | 11/2000 | Federman |
| 6,181,287 B1 | | 1/2001 | Beigel |
| 6,192,253 B1 | | 2/2001 | Charlier et al. |
| 6,290,138 B1 | | 9/2001 | Ohno et al. |
| 6,305,716 B1 | | 10/2001 | Warther et al. |
| 6,325,294 B2 | | 12/2001 | Tuttle et al. |
| 6,404,341 B1 | * | 6/2002 | Reid ................ 340/572.8 |
| 6,441,736 B1 | | 8/2002 | Leighton |
| 6,457,643 B1 | | 10/2002 | Way |
| 6,484,947 B1 | | 11/2002 | Miyata |
| 6,581,824 B1 | | 6/2003 | McClure et al. |
| 6,588,658 B1 | | 7/2003 | Blank |
| 6,674,923 B1 | | 1/2004 | Shih et al. |
| 6,693,544 B1 | | 2/2004 | Hebbecker |
| 6,700,493 B1 | | 3/2004 | Robinson |
| 6,724,690 B1 | | 4/2004 | Endo et al. |
| 6,769,718 B1 | | 8/2004 | Warther et al. |
| 6,779,727 B2 | | 8/2004 | Warther |
| 6,782,648 B1 | | 8/2004 | Mosher, Jr. |
| 6,784,017 B2 | | 8/2004 | Yang et al. |
| 6,836,215 B1 | | 12/2004 | Laurash et al. |
| 6,888,502 B2 | | 5/2005 | Beigel et al. |
| 6,924,688 B1 | | 8/2005 | Beigel |
| 6,971,200 B2 | | 12/2005 | Valenti, Jr. |
| 6,992,952 B2 | | 1/2006 | Endo et al. |
| 6,994,262 B1 | | 2/2006 | Warther |
| 7,022,385 B1 | | 4/2006 | Nasser |
| 7,042,360 B2 | | 5/2006 | Light et al. |
| 7,071,826 B2 | | 7/2006 | Peterson |
| 7,109,871 B2 | | 9/2006 | Lentine et al. |
| 7,119,690 B2 | | 10/2006 | Lerch et al. |
| 7,144,470 B2 | * | 12/2006 | Duschek et al. ............ 156/259 |
| 7,187,055 B2 | | 3/2007 | Beigel |
| 7,188,764 B2 | | 3/2007 | Penuela |
| 7,204,425 B2 | | 4/2007 | Mosher, Jr. et al. |
| 7,204,652 B2 | | 4/2007 | Warther |
| 7,207,488 B2 | | 4/2007 | Hammerslag et al. |
| 7,225,993 B2 | | 6/2007 | Warther |
| 7,230,519 B2 | | 6/2007 | Coughlin et al. |
| 7,240,446 B2 | | 7/2007 | Bekker |
| 7,316,358 B2 | | 1/2008 | Kotik et al. |
| 7,327,251 B2 | | 2/2008 | Corbett, Jr. |
| 7,375,638 B2 | | 5/2008 | Light et al. |
| 7,377,447 B2 | | 5/2008 | Oberle |
| 7,450,012 B2 | | 11/2008 | Harmon |
| 7,454,855 B2 | | 11/2008 | Kotik et al. |
| 7,520,078 B2 | | 4/2009 | Ali et al. |

(56) References Cited

U.S. PATENT DOCUMENTS

| | | |
|---|---|---|
| 7,584,896 B2 | 9/2009 | Warther |
| 7,845,569 B1 | 12/2010 | Warther et al. |
| 7,909,955 B2 | 3/2011 | Warther |
| 2001/0023014 A1 | 9/2001 | Patel et al. |
| 2002/0084325 A1 | 7/2002 | Reardon |
| 2002/0087394 A1 | 7/2002 | Zhang |
| 2003/0016122 A1 | 1/2003 | Petrick |
| 2003/0042317 A1 | 3/2003 | Behm et al. |
| 2003/0042731 A1 | 3/2003 | Li |
| 2003/0173408 A1 | 9/2003 | Mosher et al. |
| 2003/0174049 A1 | 9/2003 | Beigel et al. |
| 2004/0090868 A1 | 5/2004 | Endo et al. |
| 2004/0091659 A1 | 5/2004 | Banks et al. |
| 2004/0104274 A1 | 6/2004 | Kotik et al. |
| 2004/0111335 A1 | 6/2004 | Black et al. |
| 2004/0188010 A1 | 9/2004 | Chaoui |
| 2005/0097896 A1 | 5/2005 | Critchley et al. |
| 2005/0108912 A1 | 5/2005 | Bekker |
| 2005/0146435 A1 | 7/2005 | Girvin et al. |
| 2005/0184874 A1 | 8/2005 | Mosher |
| 2005/0205202 A1 | 9/2005 | Chaoui et al. |
| 2006/0019745 A1 | 1/2006 | Benbrahim |
| 2006/0032907 A1 | 2/2006 | Zercher |
| 2006/0037502 A1 | 2/2006 | Warther |
| 2006/0076402 A1 | 4/2006 | Lerch et al. |
| 2006/0077060 A1 | 4/2006 | Lerch et al. |
| 2006/0087437 A1 | 4/2006 | Lerch et al. |
| 2006/0091671 A1 | 5/2006 | Raming |
| 2006/0129308 A1 | 6/2006 | Kates |
| 2006/0192674 A1 | 8/2006 | Roberta |
| 2006/0200674 A1 | 9/2006 | Welker et al. |
| 2006/0230661 A1 | 10/2006 | Bekker |
| 2007/0008138 A1 | 1/2007 | Mosher et al. |
| 2007/0012771 A1 | 1/2007 | Singleton |
| 2007/0018832 A1 | 1/2007 | Beigel et al. |
| 2007/0026144 A1 | 2/2007 | Park et al. |
| 2007/0028495 A1 | 2/2007 | Kotik et al. |
| 2007/0120687 A1 | 5/2007 | Lerch et al. |
| 2007/0159332 A1 | 7/2007 | Koblasz |
| 2007/0194129 A1 | 8/2007 | Jones |
| 2007/0199988 A1 | 8/2007 | Labgold et al. |
| 2008/0236011 A1 | 10/2008 | Bekker |
| 2008/0290176 A1 | 11/2008 | Fleet |
| 2009/0009412 A1 | 1/2009 | Warther |
| 2010/0065648 A1 | 3/2010 | Warther |

FOREIGN PATENT DOCUMENTS

| | | |
|---|---|---|
| WO | 2006052422 A2 | 5/2006 |
| WO | 2007011514 A2 | 1/2007 |

OTHER PUBLICATIONS

EP Patent Application 07255085.8; European Search Report dated Feb. 27, 2009, 10 pages.

EP Search Report issued on Mar. 11, 2010 in EP Application No. 05812331.6.

Int'l Preliminary Report on Patentability issued on Oct. 9, 2007 in Int'l Appln. No. PCT/US2005/037945.

* cited by examiner

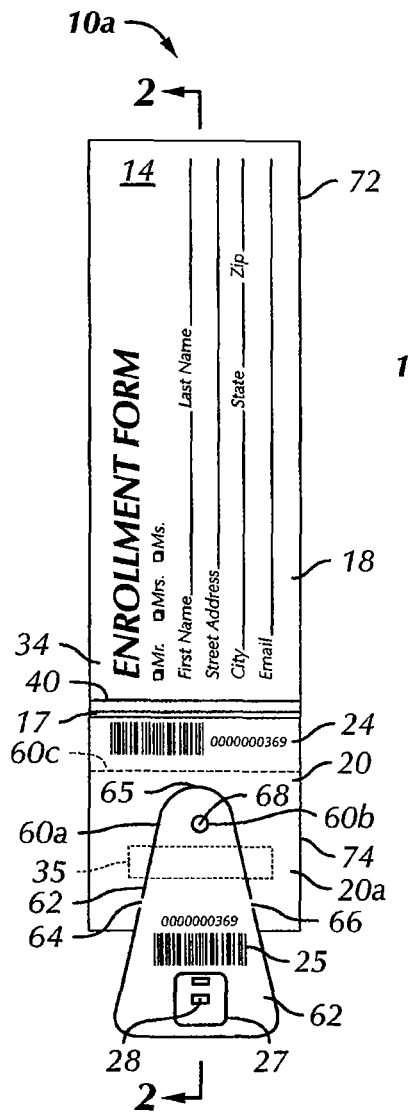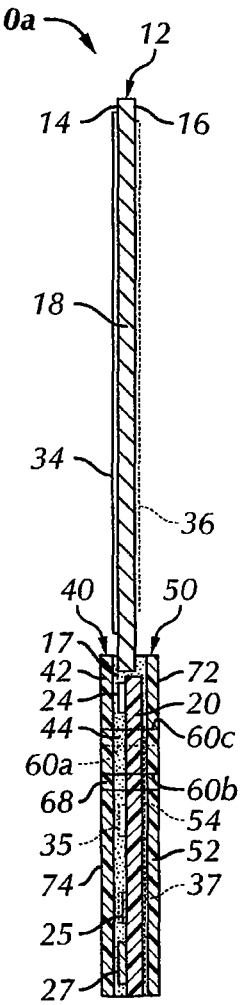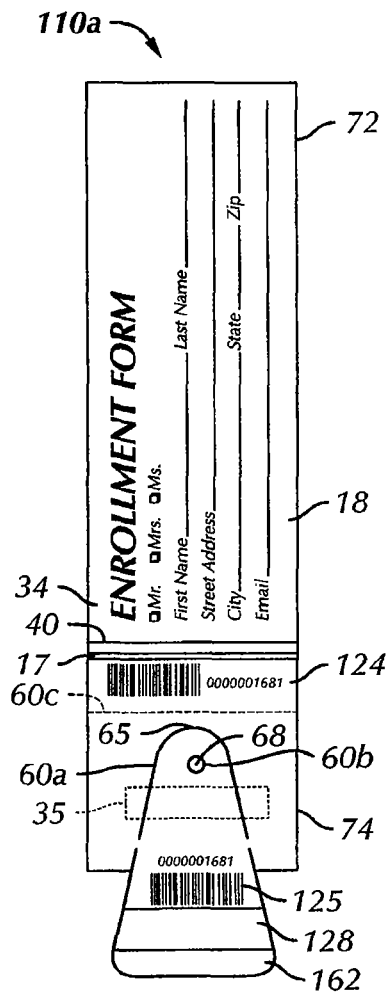
FIG. 1
FIG. 2
FIG. 5

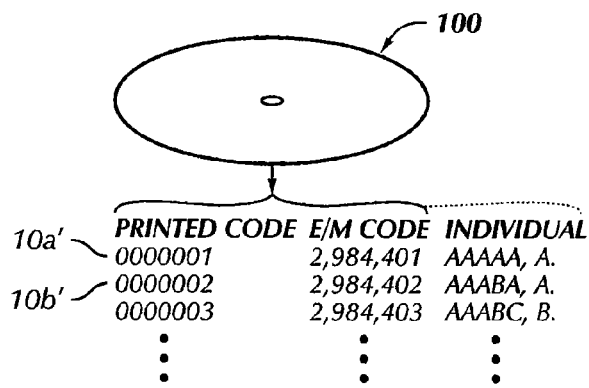
FIG. 4
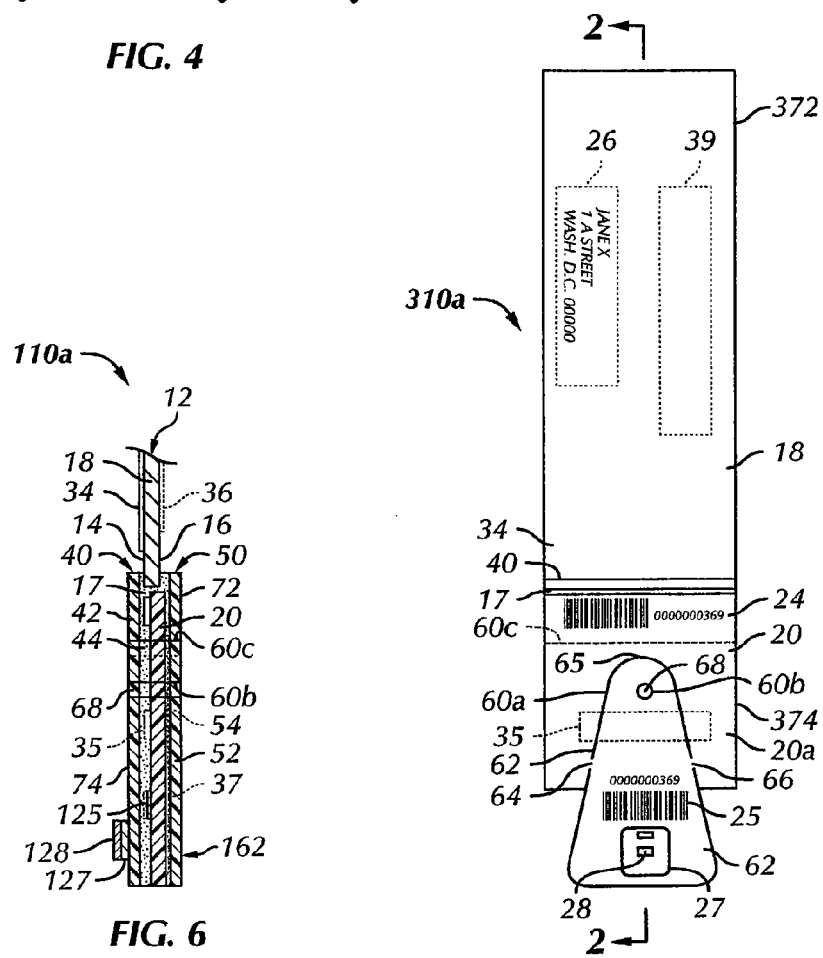
FIG. 6
FIG. 10

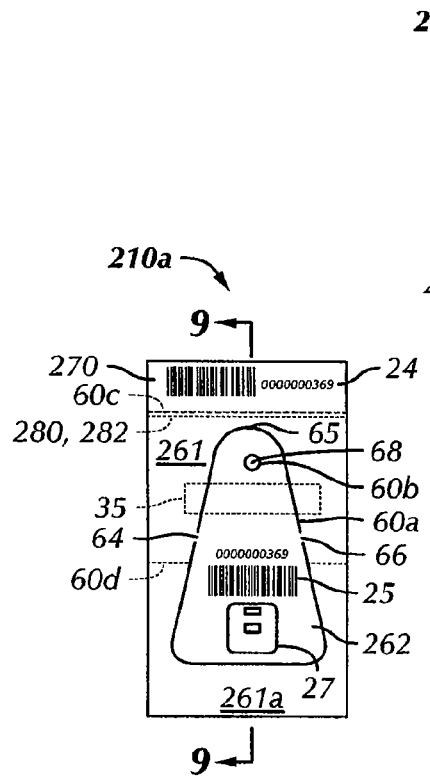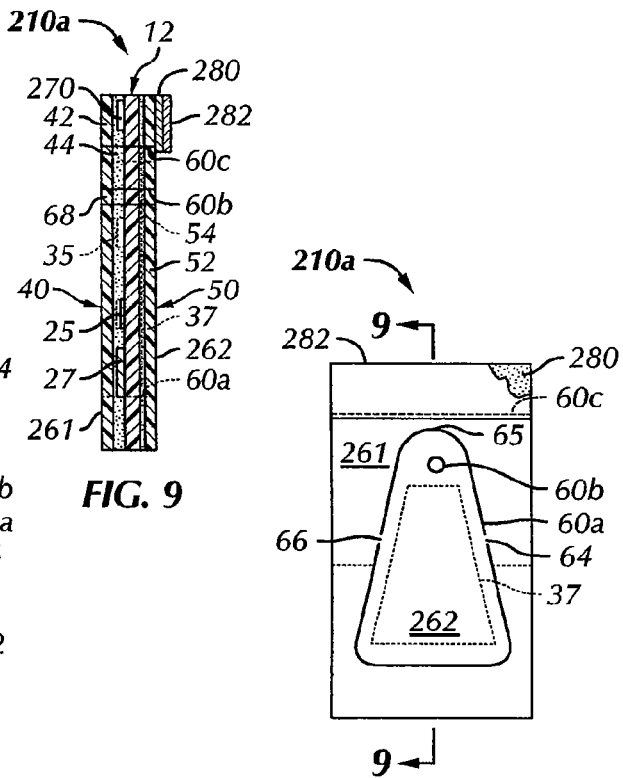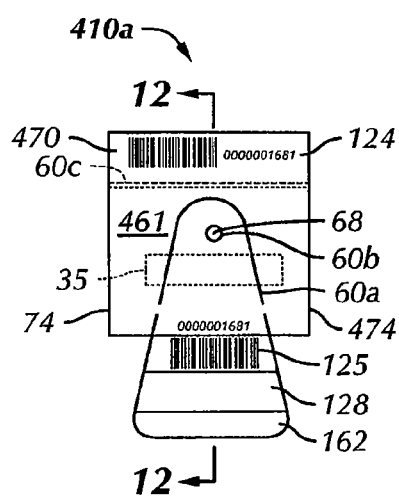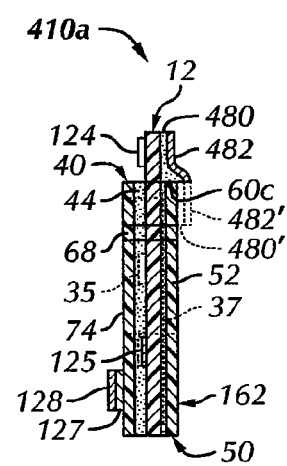
FIG. 7  FIG. 9  FIG. 8
FIG. 11  FIG. 12

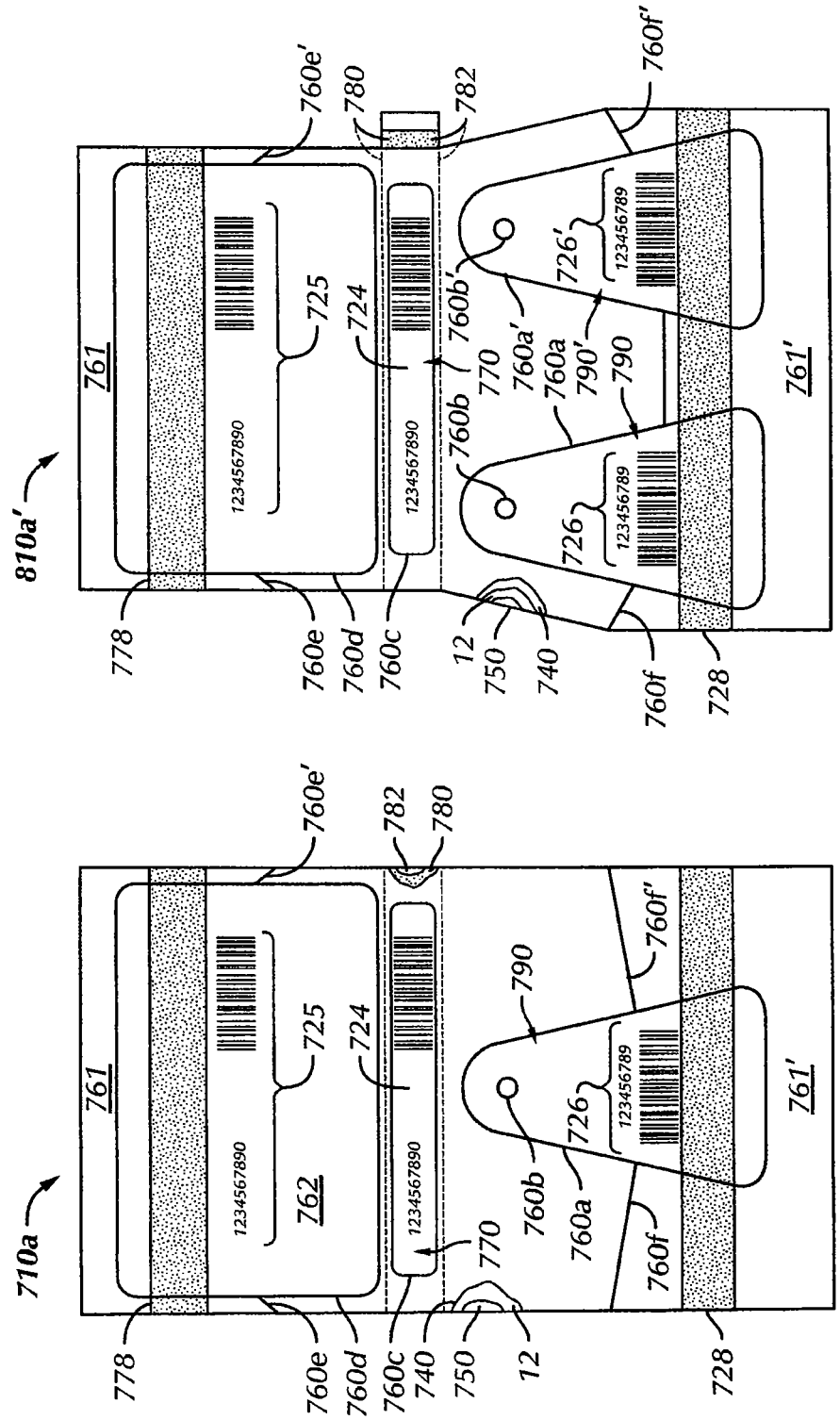

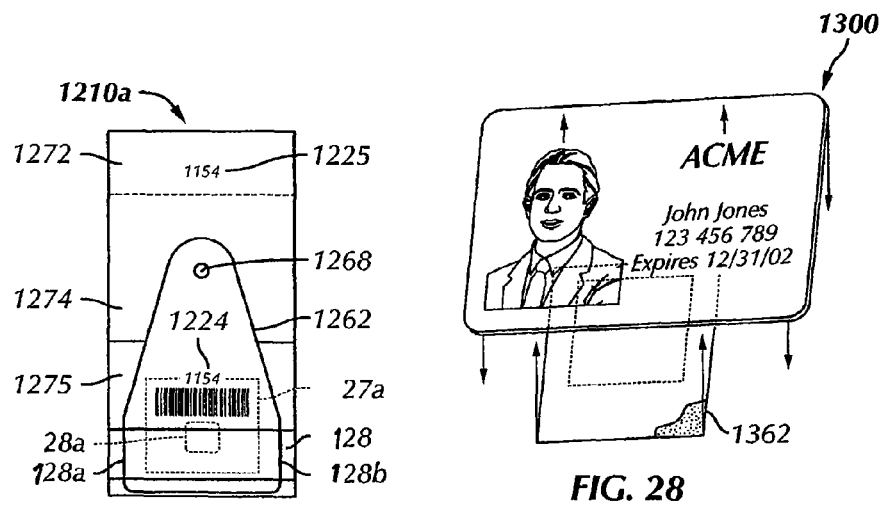
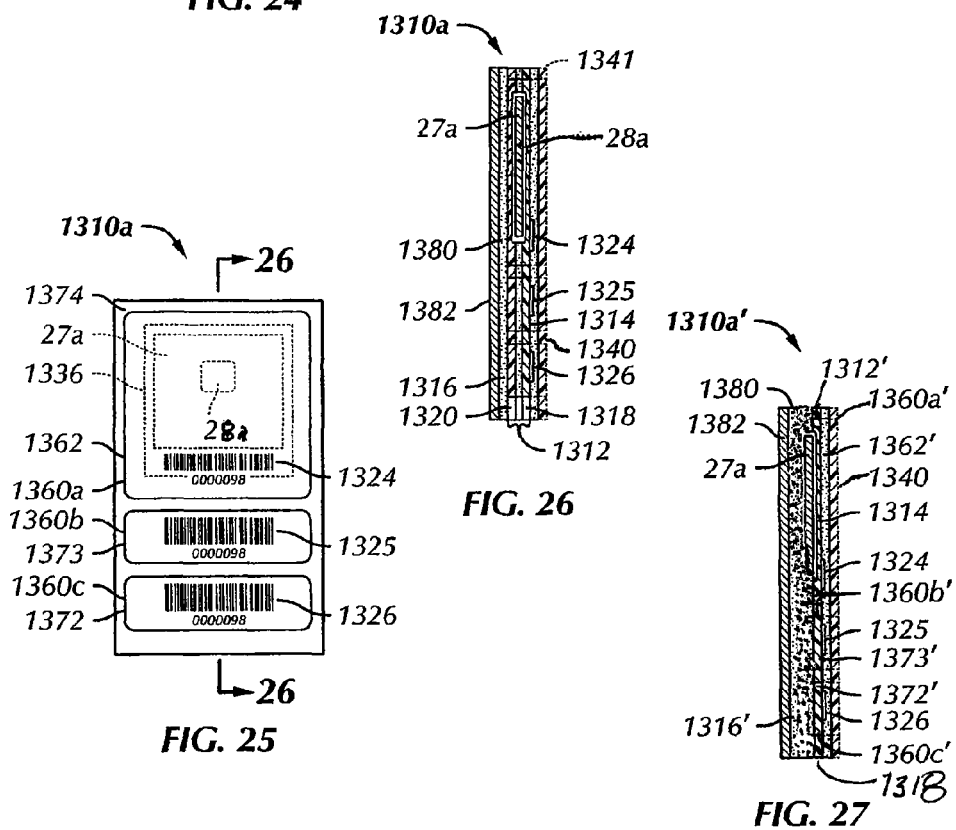

METHODS OF MAKING PRINTED PLANAR RADIO FREQUENCY IDENTIFICATION ELEMENTS

CROSS-REFERENCE TO RELATED APPLICATIONS

This application is a continuation-in-part of application Ser. No. 11/735,891 filed Apr. 16, 2007, now U.S. Pat. No. 7,909,955, which is a continuation of application Ser. No. 11/099,998 filed Apr. 6, 2005, now U.S. Pat. No. 7,204,652, which is a continuation-in-part of application Ser. No. 10/279,752 filed Oct. 23, 2002, now U.S. Pat. No. 6,994,262, claiming priority to Application No. 60/401,789 filed Aug. 7, 2002, and which is a continuation-in-part of application Ser. No. 09/595,825 filed Jun. 16, 2000, now abandoned, itself a continuation-in-part of application Ser. No. 09/532,113 filed Mar. 21, 2000, now U.S. Pat. No. 6,769,718, and claiming priority to Application No. 60/139,684 filed Jun. 16, 1999. This application is also a continuation-in-part of application Ser. No. 12/951,749 filed Nov. 22, 2010, and claiming priority to Application No. 61/263,186 filed Nov. 20, 2009, and itself a continuation-in-part of application Ser. No. 11/967,502 filed Dec. 31, 2007 claiming priority to Application No. 60/882,623 filed Dec. 29, 2006. This application is also a continuation-in-part of application Ser. No. 12/960,941 filed Dec. 6, 2010, claiming priority to Application No. 61/301,411 filed Feb. 4, 2010 and itself a continuation-in-part of application Ser. No. 12/416,637 filed Apr. 1, 2009, now U.S. Pat. No. 7,845,569 claiming priority to Application No. 61/041,454 filed Apr. 1, 2008. Each and every one of the foregoing applications and patents is incorporated herein in its entirety. Further priority is claimed to U.S. Application No. 60/559,789 filed Apr. 6, 2004.

BACKGROUND OF THE INVENTION

The present invention relates to sheet products and, in particular, to printed sheet products such as uniquely encoded identification and transaction cards, tags, labels and other identification elements, particularly containing electric circuits.

Various printed sheet product including uniquely encoded identification elements removable from a larger printed sheet product with other elements and/or other unique information (e.g., name and address of individual assigned unique identifier element) are disclosed in U.S. Pat. Nos. 4,978,146; 5,863,016; 6,010,159 and 6,039,356. It would be desirable to provide similar or other identification elements with greater data capability and/or more diverse uses.

BRIEF SUMMARY OF THE INVENTION

In one aspect, the invention is a method of making a multilayer, integral, individual planar radio frequency identification element comprising the steps of: encapsulating at least a first passive radio frequency identification transponder assembly between two plies of flexible porous planar polymer material intimately bonded together around the assembly to form a multilayer planar core, each ply being microvoided substantially uniformly throughout, and scoring the multilayer core to define at least a first multilayer, integral, individual planar radio frequency identification element including the first passive radio frequency identification transponder assembly separable from a remainder of the core.

In a further aspect the invention is a method of making a multilayer, integral, individual planar radio frequency identification element wherein at least a second passive radio frequency identification transponder assembly is encapsulated with the first passive radio frequency identification transponder assembly between two plies of flexible porous planar polymer material. Where the first and second passive radio frequency identification transponder assemblies operate on the same radio frequency, the scoring step further comprises scoring a second multilayer, integral, individual planar radio frequency identification element including the second passive radio frequency identification transponder assembly separable from first multilayer, integral, individual planar radio frequency identification element and a remainder of the core. Where the first and second passive radio frequency identification transponder assemblies operate on different radio frequencies, the scoring step further comprises scoring the first multilayer, integral, individual planar radio frequency identification element to include the second passive radio frequency identification transponder assembly with the passive radio frequency identification transponder assembly in the first multilayer, integral, individual planar radio frequency identification element.

In yet another aspect, the invention further includes the first multilayer, integral, individual planar radio frequency identification elements made according to any of the disclosed methods.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings, which are at least partially diagrammatic:

FIG. 1 is a plan view of a first embodiment exemplary individual printed sheet product of the present invention with integral removable radio frequency responsive identification element.

FIG. 2 is a cross-sectional view of the individual printed sheet product of FIG. 1 taken along the lines 2-2 in FIG. 1;

FIG. 4 depicts diagrammatically a separate portable data storage element storing at least the unique codes of the individual printed sheet products of FIGS. 1-3;

FIG. 5 is a plan view of a second embodiment exemplary individual printed sheet product with integral, removable electro/magnetic identification element;

FIG. 6 is a cross section of FIG. 5 taken along the lines 6-6 in FIG. 5;

FIG. 7 is a plan view of a third embodiment exemplary individual printed sheet product with integral, removable, electro/magnetic identification element;

FIG. 8 is a plan view of the opposite side of the third embodiment of FIG. 7;

FIG. 9 is a cross section of the product of FIG. 7 taken along the lines 9-9 in FIGS. 7 and 8;

FIG. 10 is a plan view of a fourth embodiment exemplary individual printed sheet product with integral, removable, electro/magnetic identification element;

FIG. 11 is a plan view of a fifth embodiment exemplary individual printed sheet product of the present invention;

FIG. 12 is a cross-section taken along the line 12-12 of FIG. 11.

FIG. 15 is a plan view of an eighth embodiment exemplary individual printed sheet product of the present invention;

FIG. 16 is a plan view of a ninth embodiment exemplary individual printed sheet product of the present invention;

FIG. 24 is a top plan view of a twelfth embodiment exemplary individual printed sheet product of the present invention;

FIG. 25 is a top plan view of a thirteenth embodiment exemplary individual printed sheet product of the present invention;

FIG. 26 is a cross section taken along lines 26-26 in FIG. 25;

FIG. 27 is a cross section taken along lines 26-26 in FIG. 25 of an alternate construction of the thirteenth embodiment; and FIG. 28 is a perspective view of the RFID tag of the thirteenth embodiment exemplary individual sheet product of FIG. 25 mounted to a conventional identification card.

DETAILED DESCRIPTION OF THE INVENTION

Figure 3:
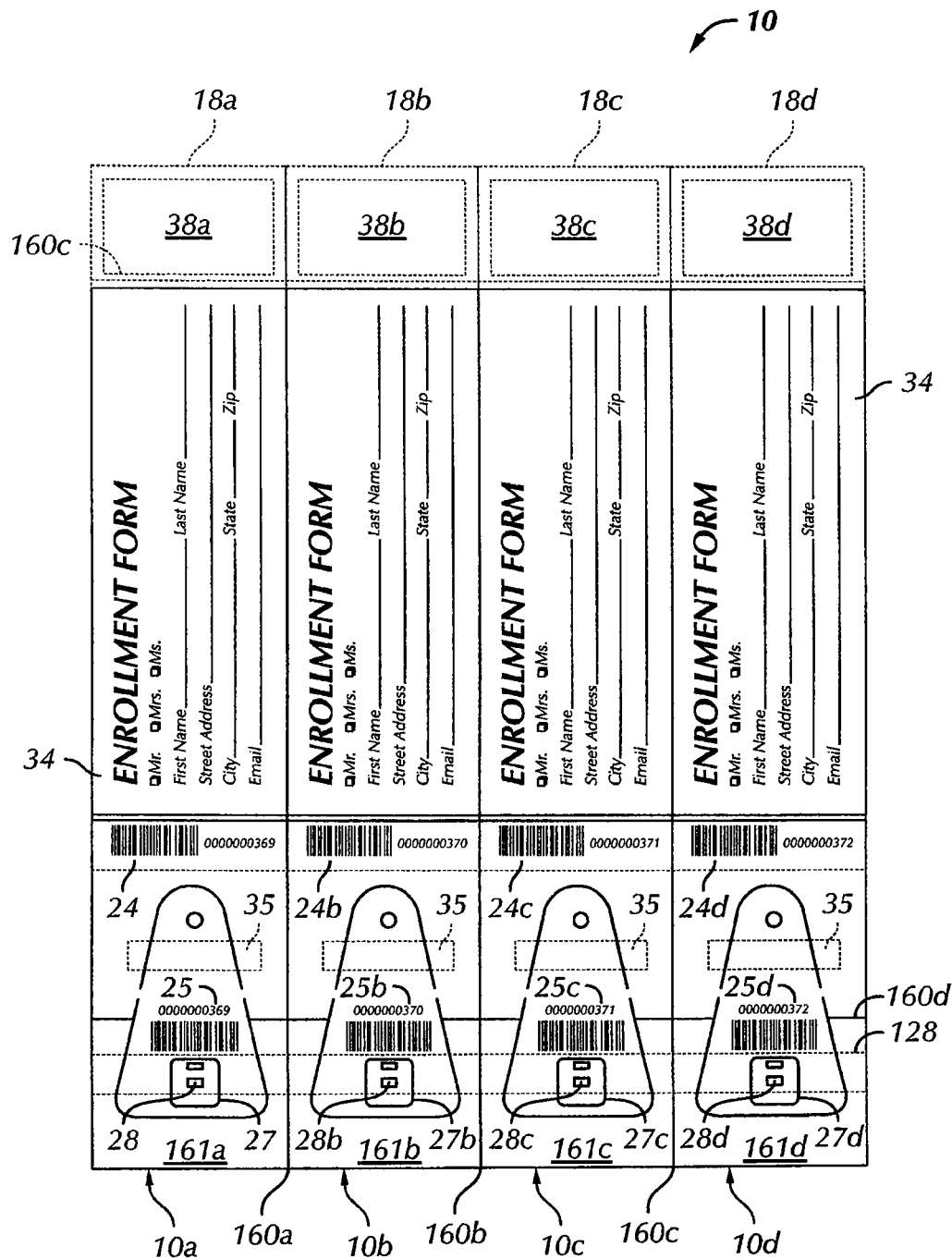
FIG. 3 is a plan view of another printed sheet product of the present invention incorporating the individual printed sheet product of FIGS. 1-2.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import. Furthermore, the term "electro/magnetic" is used to refer generally to devices that are electrical or magnetic or both and other than photonic in character, function and/or data storage or transmission.

In the drawings, like numerals indicate like elements. FIGS. 1 and 2 depict a multilayer, integral, individual printed sheet product 10a of the present invention which is an application form that maintains the integrity of the identification of uniquely encoded planar identification elements when the form is completed.

Individual printed sheet product 10, 10a is merely one of a number which would be produced at the same time as a "collection" or "set" in a manner to be subsequently described, each with a different unique code (or codes). Individual printed sheet product 10, 10a is depicted in FIG. 3 as part of a larger, printed sheet product 10 with other individual printed sheet products 10b-10d, which, with individual printed sheet product 10a, form a plurality. The plurality 10a-10d is part of a larger collection or set of individual sheet products 10a et seq., which typically number in the thousands and may even number in the millions.

The individual sheet product 10a of FIGS. 1-3 includes a planar, flexible, printable sheet core indicated generally at 12 having planar major opposing first and second sides 14 and 16, the first or "front" major planar side 14 being seen in FIG. 1. Core 12 may be formed from a single, integral, one-piece sheet of a single, uniform, printable material or, as is best shown in FIG. 2, core 12 may be formed by separate first and second printable core strips 18, 20. The core strips 18, 20 are each planar and flexible and, according to an important aspect of the invention, are of different materials each of which can accept printing. The strips 18 and 20 are fixedly secured together, generally edge-to-edge, side-by-side, to define a preferably monolayer core 12 of one thickness of material with a junction or joint 17. Only strip 18 forms the upper outer edge of core 12 in FIG. 1 and only strip 20 forms the lower outer edge. Machine or tractor feed holes (not depicted) can be located along the free side edge margins of each strip 18 and 20, respectively, (upper and lower margins in FIG. 1) for continuous manufacture of complete collections or sets of the individual sheet products from rolls of the strip materials. Alternatively, collections or sets of the individual sheet products 10 can be made from a plurality of sheets like sheet product 10 of FIG. 3, each of the same predetermined size (e.g., 8½×11, 14×17, etc.) and each of which constitutes a sheet product of the present invention.

Referring back to FIG. 1, the second core strip 20 is printed on the first major planar side 14 of the core 12 with at least one and, more typically, a plurality of spaced-apart, variable data fields. Two variable data fields are identified at 24 and 25. Each variable data field 24 and 25 is printed with a unique code and the codes printed in the variable data fields 24-25 are identical, namely, "0000000369" in the indicated example. The variable data fields 24-25 constitute a set, each with the same unique printed code. Referring to FIG. 3, each other individual printed sheet product 10b-10d also has its own set of variable data fields: code fields 24b/25b; 24c/25c; and 24d/25d, respectively. Each set of the code fields is encoded with the same code unique to the set and different from each other set of printed codes of the sheet product 10 and of the larger collection of individual sheet products 10a et seq., only four of which are depicted. The location of the variable data fields 24-25 preferably remains the same in each individual sheet product 10a, 10b, etc. Only the unique code printed in the variable data fields would change from individual sheet product 10a to individual sheet product 10b, 10c, etc. The unique code may be printed in human readable characters or in machine readable formats, e.g., bar codes, or in both formats (as depicted) in either or both of the first and second variable data fields 24, 25. Preferably, all printed codes are capable of being optically as well as machine read. This construction permits all of the machine readable printed variable data fields to be located on one of two core strips used. Of course, if the core 12 is formed from a single strip of core material, variable data field 25 could be located anywhere on the sheet product 10a, including the opposite end (upper end in FIGS. 1-3) of the sheet product 10a.

In addition to the variable data fields 24-25, the sheet product 10 includes one or more printed static graphic fields with two fields 34, 35, being depicted on the first side of 14 of the core 12. The second side 16 of the core 12 typically includes at least one or more printed static graphic fields, two fields 36 and 37 being indicated in phantom block diagram form on FIG. 2. Field 35 is also indicated in phantom block diagram form in FIGS. 1 and 2. Static graphic fields generally may be a graphic image or text or a combination, which is typically repeated identically on each other individual printed sheet product 10b, 10c, etc. of the collection or set. The static graphic field(s) 34-37 typically would remain unchanged from printed individual sheet product 10a to printed individual sheet product 10b, etc. within a set or collection of such individual products 10a et seq. This is particularly true of static graphic fields of text providing information or creating forms. Decoration graphics need not be identical on each individual sheet product 10a but would typically be provided in a single pattern that might span several adjoining individual sheet products and then be repeated on consecutive adjoining individual sheet products thereafter. However, unlike variable data fields, static graphic fields carry no unique data, that is, no data unique to the identification device or the person assigned the device. One of the advantages of the present invention is that its construction allows the printing of information (static graphic and variable data) on both sides of the sheet products and their various removable elements.

Static graphic fields 34, 35 are associated with the first and second variable data fields 24 and 25, respectively. Static graphic field 34 preferably is an identification block preprinted to indicate where on the first core strip 18, a name and address of an individual is manually entered to identify the individual to whom the individual sheet product and the unique code(s) of the individual sheet product 10a et seq. are assigned. The particular formats of the various static graphic fields 34-37 are not important to this embodiment of the present invention beyond the provision on the first planar strip 18 of a location (i.e., static graphic field 34) to manually enter an identification of an individual to whom the unique code(s) of the sheet product 10a et seq. is assigned.

Referring back to FIG. 2, a first cover strip indicated generally at 40 is integrally and permanently secured to the core 12 and preferably to each of the first and second core strips 18 and 20 spanning joint 17 and holding the first and second core strips 18, 20 in generally edge-to-edge, side-by-side position as shown in FIGS. 1 and 2. Preferably, the first cover strip 40 only partially covers the first or "front" major planar side 14 of the core 12 but at least partially covers each of the first and second core strips 18 and 20 while extending completely across the first major planar side 14 and each of the first and second core strips 18 and 20 (left to right in FIG. 1). The "upper" edge of strip 40 is noted in FIG. 1 by the lead line from reference numeral 40. Preferably, the first cover strip 40 covers enough of each of the first and second core strips 18 and 20 to assure that each is permanently and integrally secured with the other. The first cover strip 40 may be provided by a polymer film 42 and an appropriate adhesive layer 44, preferably a heat or light activated adhesive for permanence.

In the depicted embodiment 10a, a second cover strip 50 is preferably provided, integrally secured to each of the first and second core strips 18 and 20, again only partially covering the second, "rear" major planar side 16 of the core 12 and each of the first and second core strips 18 and 20. Second cover strip 50 again preferably extends completely across the second major side 16 and each of the first and second core strips 18 and 20, again left to right in FIG. 1 but only partially along core 12 and core strip 18 in the vertical direction.

Individual sheet product 10a further includes a planar, electro/magnetic data storage element 28, which is encoded with a unique electro/magnetic code. The preferred data storage element 28 includes a non-volatile (read only) memory, which is part of a generally planar, radio frequency identification ("RFID") transponder assembly 27 configured to transmit an electro/magnetic signal containing at least the unique electro/magnetic code and possibly other information in response to a radiated, e.g., radio frequency ("RF") interrogation signal. As will be later described, passive RFID assemblies include an antenna and a small chip connected to the antenna. The chip includes the read only memory as well as RF receiver and RF transmitter circuitry and a power circuit configured to temporarily store energy from the received RF signal and use that energy to transmit the RF response. The assembly 27 preferably also include programmable (random access) memory and control circuitry that may include security applications associated with use of the element. The assembly 27 is preferably permanently and integrally fixed together with at least one of the core 12 and the first cover strip 40, in product 10a on the first side 14 of the core 12, by being bonded between and with the polymer film 42 and the core 12 by the adhesive 44 of the first cover strip 40. The electro/magnetic transponder assembly 27 may be first "tacked" to the core 12 before the core 12 is joined with the first cover strip 40 or even before the core strips 18, 20 are joined. Such RFID assemblies 27 (also sometimes referred to as "inlays") are available from a variety of suppliers, including but not limited to, Motorola of San Diego, Calif.; Texas Instruments of Attleboro, Mass., Checkpoint Systems of Thorofare, N.J.; Gemplus Corp. of Redwood City, Calif.; Hughes Identification Devices of Tustin, Calif.; Cotag International of Wilmington, Del.; Abbhafo Incorporated of San Diego, Calif.; and Balough T.A G. of Ann Arbor, Mich. For example, Gemplus offered smart labels in three shapes: a small square approximately one-half inch square, a large square approximately one inch square and a small disk. All three sizes come in two versions, read-only and read/write. Each read-only version contains a unique, tamperproof code of sixty-four bits, which is directly programmed during manufacture. The read/write version has a 2 kb EEPROM memory that offers different access possibilities. Various additional shapes, sizes and/or capacities are and will be available and can be used. The smallest size is particularly useful on key tags and other smaller elements. Typically such devices require for interrogation the use of readers supplied by various manufacturers.

Still referring to FIG. 1, scoring indicated generally at 60a, 60b and 60c is provided in the sheet product 10a and extends at least sufficiently through and along the sheet product 10a and through the second core strip 20 and, in this embodiment 10a, through the provided first cover strip 40 and the second cover strip 50, where present, to define at least one identification element 62 removable from a remainder of the individual sheet product 10a. The scoring 60a and 60c further separates the second printed variable data field 25 from the other printed variable data field(s) 24.

The first removable identification element 62 is preferably planar and multilayer in construction and preferably includes at least the second variable data field 25 of the plurality of variable data fields 24-25 but only a portion of second core strip 20, the first cover strip 40 and the second cover strip 50, if provided. Preferably, one or more narrow bridges of continuous material 64-66 spanning the first removable element 62 and the remainder of the sheet product 10a releasably retain the first removable element 62 in the sheet product 10a until removed. Preferably, another portion 60b of the scoring defines a closed perimeter opening 68 entirely within and entirely through the first removable element 62 to enable the element 62 to be attached to a key ring, key case or other key holder (none depicted).

Although the element 62 is generally triangular in shape, a variety of other shapes, both non-rectangular and rectangular, could be used, although non-rectangular shapes are more distinct, and sometimes easier to use. Preferably key tag element 62 is smaller in size than a conventional credit or business card which are typically about three and three-eighths by two and one-eighth inches or more in size, with a maximum planar diagonal dimension of about three and seven-eighths inches in length. Key tag 62 is smaller than that having a maximum dimension in the plane of the tag 62 of less than three and one half inches and having no second dimension in the plane of the element 62 in a direction perpendicular to the maximum dimension greater than two inches.

Still referring to FIG. 1, according to another important aspect of the present invention, the scoring preferably further includes a line of perforations 60c (or other line of weakness), which extends across the sheet product 10a and sufficiently through the second core strip 20, the first cover strip 40 and/or the second cover strip 50, where provided, to define first and second separable sheet components 72 and 74. At least one of the printed variable data fields, the first variable data field 24 in this embodiment, is separated from the removable identification element 62 and is left on an integral remainder of the individual sheet product 10a which includes the first core strip 18. The first separable sheet component 72 is integral and includes the entirety of the first core strip 18 and a portion of the second core strip 20 including the first printed variable data field 24. The second separable component 74 includes the removable identification element 62 and a scrap portion 20a of the second core strip 20, which is connected to and releasably retains the removable identification element(s) 62. The second separable component 74 can be separated from the first component 72 and given to a customer or client who keeps the removable identification element(s) 62. The first separable sheet component 72 is retained with identification information of the individual to whom the second separable sheet component 74 was given manually entered into the static graphic field 34. The first variable data field 24 with the unique printed code remains attached with the individual identification information manually entered into the static graphic field 34 and is kept as a permanent record by the sheet product provider. In this way, identification element(s) with pre-entered electro/magnetic codes can be easily assigned to randomly appearing individuals at a retail point of distribution and a record of that assignment easily made.

Specific manufacturing details and materials, including suggested materials and manufacturing techniques, as well as other configurations of printed sheet products including removable planar, printed identification elements have been disclosed in prior U.S. Pat. Nos. 4,978,146, 5,495,981 5,743, 567, 5,769,457, 5,863,076, 6,010,159 and/or 6,039,356, and Application Nos. 60/126,476 filed Mar. 26, 1999, 60/139,684 filed Jun. 16, 1999, 60/401,789 filed Aug. 7, 2002, Ser. NO. 09/532,113 filed Mar. 21, 2000, and Ser. No. 09/595,825 filed Jun. 16, 2000, each of which is incorporated by reference herein in its entirety. Suggestedly, first core strip 18 comprises and, preferably, consists essentially of cellulose material, namely paper stock, to reduce the overall cost of the product 10a. The second core strip 20 preferably comprises a polymer material stiffer and thicker than the paper sheet stock to provide stiffness and thickness to the removable key tag (or card) element(s) 62 yet still flexible for processing. The polymer material is one that accepts printing, preferably one which accepts laser printing. Strip 20 preferably consists essentially of a porous, specifically microvoided, polymer sheet material such as Teslin® of PPG Industries, Pittsburgh, Pa., or Artisyn® of Daramic, Inc., Charleston, S.C., both microvoided, polysilicate sheet materials for laser printing. Teslin® is described in detail in U.S. Pat. No. 4,861,644, incorporated by reference herein. See also published U.S. Application No. 2001 0023014 also incorporated by reference herein. Teslin® is relatively very porous with a porosity of more than fifty percent.

The second cover strip 50 on the second or rear major planar side 16 of the planar core 12 suggestedly comprises and preferably consists essentially of a transparent polymer film carrier 52 bonded to core 12 with an appropriate adhesive 54 and is the preferred cover strip used to join the two core strips 18, 20 together at joint 17. This permits laser printing of variable data fields and installation of RFID assemblies 27 directly on the first side of the core 12, if desired before attachment of the first core strip 40. Polyester provides good strength, wear and soil resistance properties to the outer surface of each of the removable element(s) 62 etc. However, if durability of the removable element(s) is not a factor and reduced cost would be advantageous, the polymer film carrier 52 of the second cover strip 50 can be a less expensive material such as conventional cellophane or 3M brand Magic invisible or transparent tape or any of their industry equivalents with a pressure sensitive adhesive sufficient to hold the core strips together, at least until the first cover strip 40 is applied spanning the joint 17. At least the first cover strip 40 on the first (front) major planar side 14 of the core 12 and individual sheet product 10a would suggestedly be a more durable, polyester material that is transparent to visible light or at least infrared light so that the variable data fields 24, 25, etc. beneath the cover strip 40 can be seen by humans, if desired, or at least read by machine such as by an infrared scanner.

While both strips 40, 50 are shown to extend over the junction 17 between the first and second core strips 18 and 20, only one of the two cover strips 40 or 50, if it is actually used as the sole means to join the first and second core strips 18, 20 together, need span the junction 17 for purposes of the present invention. Similarly, cover strip 50 need not be provided at all. The primary purpose for providing second cover strip 50 is to protect the rear face of the removable element 62 and to further prevent tampering with the printed fields on that side of the element. For that purpose, second cover strip 50 need only span the second core strip 20 overlapping the scoring 60*a* defining the removable card element 62. The upper edge of one of the cover strips 40, 50 might, for example, terminate at a location between the scoring 60*a* and the first printed variable data field 24, or at a location just above variable data field 24 spanning the scoring 60*a*-60*c* and first variable data field 24, if that field is to be protected as well. If desired, the upper edges of both cover strips 40, 50 can be terminated between scoring 60*a* and data field 24 and another adhesive strip, e.g., transparent tape, used to join the core strips.

FIG. 3 depicts yet another printed sheet product 10 of the present invention, which is formed by a plurality of individual sheet products 10*a*, 10*b*, 10*c* and 10*d*, respectively. The sheet product 10 is printed with a plurality of sets of variable fields, four being shown: 24/25; 24*b*/25*b*; 24*c*/25*c*; and 24*d*/25*d*. The printed codes of each set 24/25, 24*b*/25*b*, 24*c*/25*c* and 24*d*/25*d*, are identical in the set, unique to the set and to the individual printed sheet product 10*a*, 10*b*, 10*c*, 10*d* and differ from each other unique set of printed codes of each other individual printed sheet product 10*a* et seq. of the set. The same is true for the data storage elements 28, 28*b*, 28*c* and 28*d*. Each such data storage element 28, et. seq., is encoded with its own unique electro/magnetic code, which differs from the electro/magnetic code of each other element 28, 28*b*-28*d* and that of each other data storage element in the total set or collection of individual sheet products of which products 10*a*-10*d* are part. The printed sheet product 110 further indicates the locations of additional score lines 160*a*-160*d* which define and separate individual printed sheet products 10*a*-10*d* from one another and from any remainder of the overall sheet product 110, such as sections 161*a*-161*d*, which are scrap. Also the core strip 18 may be made bigger to provide extended areas 18*a*-18*d* on each removable element 10*a*-10*d*, preferably with another static graphic field 38*a*-38*d*, respectively, which might be a logo or instructions or a coupon, etc. and may be made removable by score line 160*e* (in phantom). Equipment to write codes on and/or read codes from magnetic strip 128 can be obtained from any of a variety of domestic and foreign manufacturers, including, but not limited to, Axiohm American Magnetics of Cypress, Calif., Mag-Tek, Inc. of Carson, Calif. and Atlantic Zeiser of West Caldwell, N.J.

Where the unique electro/magnetic code of each individual sheet product 10*a* et seq. is different from the unique printed code, a master data set must be provided linking the two codes (electromagnetic/printed) with one another and, if known, with any individual to whom the individual sheet product 10*a*-10*d* and thus the unique printed and electro/magnetic codes of that individual sheet product are assigned. This may occur because some transponder manufacturers will only ship electro/magnetic data storage assemblies precoded according to their own code schedules. This is expected to change. Alternatively, the assemblies can be obtained with programmable memories allowing other data, including other codes, to be written into data storage. FIG. 4 depicts diagrammatically a separate, preferably portable data storage element 100 storing at least the unique printed code and the unique electro/magnetic code of each individual sheet product 10*a* et seq. in a single data set. This information may be further combined with an identification of an individual person assigned the individual printed sheet product 10*a* et seq. and the two codes (printed and electro/magnetic) organized in a manner such that at least the two codes (printed and electro/magnetic) of each individual sheet product 10*a* et seq. and, where available, the identification of the individual person assigned the codes and the individual sheet product, can be identified from among pluralities of unique codes (printed and electro/magnetic) and preferably a plurality of individual person's identifications on the portable data storage element 100. The printed codes of sheet products 10*a*-10*c* are indicated diagrammatically at 10*a*'-10*c*'. The portable data storage element 100 might be any element with adequate data storage including an optical disk, a floppy disk, a hard drive, a magnetic tape, a programmable memory (e.g., ROM, RAM), etc. Alternatively, the information may be stored in a memory and accessible by phone, Internet link, satellite link, etc., to correlate the codes to an individual's identity or vice versa. This can be done as a separate step or while accessing a central data base of customers to add additional information to that maintained on the individual, for example, product purchases, visits, etc. The printed codes and electro/magnetic codes of each individual sheet product may be related to one another by an algorithm, including a one-to-one algorithm for identical printed and electro/magnetic codes on each individual sheet product. Alternatively, the codes can be random and would have to be related to one another in sets in the other data storage element 100.

A collection of the individual sheet products 10*a* et seq. might be manufactured from pluralities of cut, printed sheet products like sheet product 10 of FIG. 3 or may be made continuously from rolls of flexible component stock. Parallel alignment of the core strips 18, and first and second cover strips 40 and 50 permits such a continuous manufacture. The RFID transponder assemblies 27 may be supplied on a suitable continuous carrier, for example a thin polymer or cellulose strip (not depicted), with the assemblies fastened to the strip at uniform spacing preferably to coincide with the appropriate position of such assembly on the individual printed sheet product 10*a*, etc. on a cut sheet like product 10 of FIG. 3 or on a continuous web. See, in particular, previously referenced U.S. Pat. Nos. 5,769,457, 5,863,076, 6,010,159 and 6,039,356 for details of the cut sheet and continuous strip manufacture of individual printed sheet products 10*a* et seq.

FIG. 5 is a plan view of FIG. 1 of an alternate individual printed sheet product 110*a* including a different type of planar electro/magnetic data storage element 128. Apart from the changes associated with this data storage element 128 and the different variable printed code fields 124/125, the individual printed sheet products 10*a*, 110*a* are essentially identical in composition, form and use. The differences between the products 10*a* and 110*a* are best seen in FIG. 6, a cross-sectional view of the lower portion of FIG. 5. Everything above the joint 17 in both products 10*a*, 110*a* is identical.

Referring to FIG. 6, integrally and permanently applied over the outer side of first cover strip 40 is the planar data storage element 128 in the form of a conventional magnetic strip, which is fixed permanently and irremovably to the outer surface of first cover strip 40 by suitable means such as an adhesive layer 127. Magnetic strip 128 can be electro/magnetically encoded with and can store a unique electro/magnetic code, as well as further information if a sufficient amount of the magnetic strip 128 can be provided on the removable element 162. Unlike the limitations of the RF transducer data storage element 28, the magnetic strip 128 can easily be magnetically encoded during manufacture of the sheet products 10*a*, etc. with the same unique code printed in each of the variable data fields 124, 125 of the individual sheet product. In addition to this construction, it should be appreciated that the magnetic strip 128 can be embedded in an otherwise thin transparent cover strip and applied to the core as a single, composite cover strip (neither depicted). Pluralities of such individual sheet products can be fabricated together in the manner described with respect to FIG. 3 by substituting a continuous magnetic strip 128 (in phantom in FIG. 3) spanning the individual sheet products. Where a removable identification element includes either a printed unique machine readable code (e.g. 24) or magnetic stripe (e.g. 128) proximal an edge of a removable identification element (e.g. 162), the closed perimeter opening (e.g. 68) should be located at least one-half inch or more from an edge of the element along which the magnetic stripe (128) extends and at least one inch from any edge that the printed machine readable code (25, 125, etc.) adjoins or that a magnetic strip adjoins between the printed machine readable code and the edge. This is so that the opening (68) does not interfere with the operation of a mag stripe or bar code swipe reader through which the element is passed. According to another important aspect of the invention, an RFID transponder assembly like assembly 27 in FIGS. 1-3 can be provided in removable element 162 permanently and integrally fixed to the element, preferably between core strip 20 of core 12 and one of the cover strips 40, 50.

FIGS. 7 and 8 are plan views and FIG. 9 is a cross-sectional view, respectively, of yet a third embodiment, multilayer, integral, individual printed sheet product of the present invention indicated generally at 210a. It should be appreciated that individual printed sheet product 210a is substantially similar to that portion of individual printed product 10a of FIGS. 1-4 below the junction 17 to which an additional element, an exposable, adhesive layer 280, has been added. Referring particularly to FIG. 9, layer 280 is preferably a pressure-sensitive adhesive, and is further provided with a protective release strip 282 overlying the layer 280 until it is desired to expose the adhesive layer 280 for use. Scored key tag 262 constitutes the first identification element removable from the individual sheet product. The portion of the individual sheet product 210a above the score line 60c, including the first variable data field 24 with unique printed code and the exposable adhesive layer 280, constitutes a second planar identification element 270 removable from the remainder 261 of the individual printed sheet product 210a. The second removable identification element 270 can be used as a label, for example, attached to a separate enrollment card or enrollment sheet containing an identification of the individual person to whom the remainder of the individual printed sheet product 210a with first removable element 262 is provided. If desired, a line of scoring 60d can be provided across either side of removable element 262 to remove end 261a of the sheet product during manufacture.

FIG. 10 is a plan view of a fourth embodiment, individual printed sheet product indicated generally at 310a, which is substantially identical to individual printed sheet product 10a of FIGS. 1-3 but for the substitution of a new static graphic field 39 and a new variable data field 26 containing preprinted information of the unique individual person to whom the printed sheet product 310a and the unique printed code of the other printed variable data fields 24/25 and the unique electro/magnetic code of the planar electro/magnetic data storage element 28 are assigned. Element 310a is preferably sized to be slightly smaller than and essentially fully fill a standard size envelope (e.g., No. 9) without bending or significant movement of the sheet product 310a within the envelope so that the name and address of field 26 can be viewed through a window of the envelope (not depicted). A new first separate sheet component 372 is thus provided. It will be appreciated that variable data field 24 could be deleted in view of field 26 and another identification element (key tag or card) provided between the existing key tag 62 and printed fields 26 and 39.

Also, a magnetic storage element/strip 128 like that in FIGS. 5-6 can be added to or over either cover strip 40, 50 of the third embodiment printed sheet product 210 of FIGS. 7-9 or an RFID transponder assembly 27 added to the fourth embodiment 410a of FIGS. 11-12 to provide the two separate electro/magnetic data storage devices on the removable element 262 or 126.

It will be apparent that various modifications could be made to the individual sheet product 210a. For example, either or both of the first and second cover strips 40 and 50 can be terminated short of the first variable data field 24 and line of perforations 60c as they are not needed to secure two core strips together. This is exemplified in another possible sheet product embodiment 410a, which is depicted in plan view in FIG. 11 and cross-sectional view in FIG. 12. Sheet product 410a further differs from sheet product 210a in the substitution of magnetic strip 128 for transponder assembly 27 as done with the second embodiment 210a. Given the fact that a unique code is encoded either into the memory 28 of the transponder assembly 27 or on the magnetic strip 128, it will be appreciated that, if desired, printed variable data field 25, 125 can be omitted from the removable element 62, 162, 262. On the other hand, the line of perforation 60c of FIGS. 1-2 and 7-9 can be converted into a complete cut 60e as in FIGS. 11 and 12 and a larger adhesive layer 480 and protective release strip 482 can be applied to span the complete cut 60e to releasably hold the second removable identification element 470 with the remainder of the printed sheet product 410a, which is provided by second separable component 474 that includes key tag 162 and remainder 461. Alternatively or in addition, adhesive layer 480 and protective strip 482 can be applied further along the sheet element 410a as shown in phantom in FIG. 12 at 480' and 482' to span at least a proximal (upper) portion of the first removable element 162 to releasably secure each such element in the sheet product 410a. Again, an RFID transponder assembly 27 can be added to the removable element permanently and integrally fixed together with the core 12 and one of the cover strips 40, 50.

Figure 14:
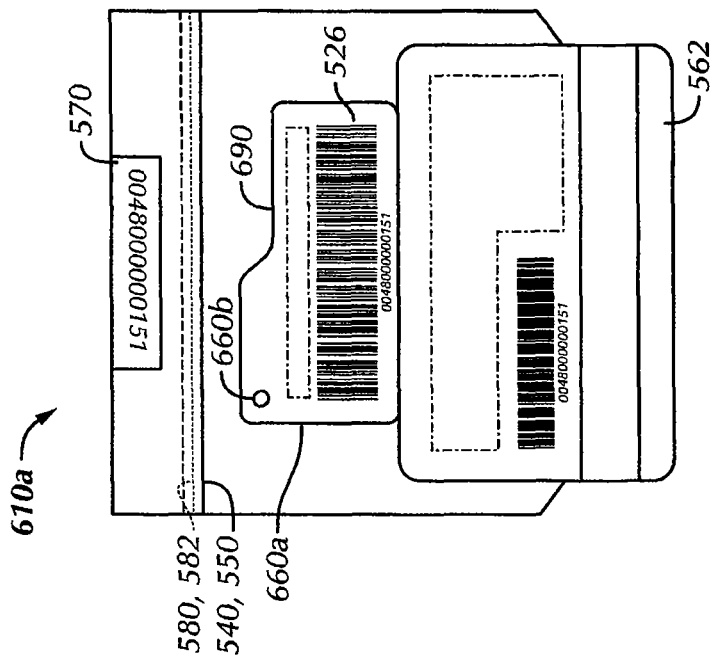
FIG. 14 is a plan view of a seventh embodiment exemplary individual printed sheet product of the present invention.
Figure 13:
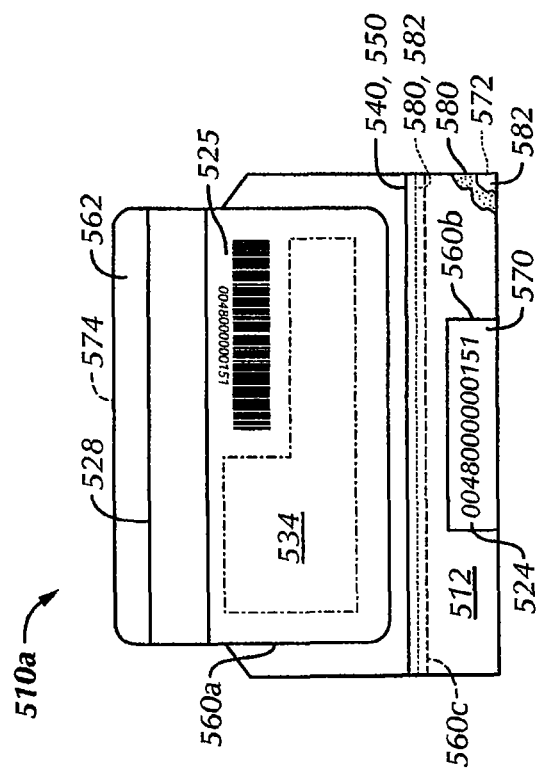
FIG. 13 is a plan view of a sixth embodiment exemplary individual printed sheet product of the present invention.

A larger, rectangular transaction card 562 can be substituted for the key tag 262 or a combination of planar, rigid, identification elements (card(s) and/or tag(s)) provided with the labels 570 as shown in FIGS. 13 and 14, which depict exemplary individual sheet product embodiments 510a and 610a, respectively.

Embodiment 510a of FIG. 13 includes a removable card element 562, a removable label element 570 separated from one another and a remainder of the individual sheet product 510a by scoring 560a and 560b, respectively. Variable data fields 524 and 525 are printed on a core 512, which is exposed on and around label element 570. The removable card element also bears magnetic strip 528 and printed static graphic field 534. One or more other static graphic fields are typically provided on the hidden major side of sheet product 510a. The overlapping lower boundaries of first and second cover strips 540/550 on the depicted and opposing major sides, respectively, are indicated in solid while the overlapping upper boundaries of the exposable adhesive layer 580 and overlying protective release strip 582 on the hidden major side of the sheet product 510a are indicated in phantom. Cover strips 540, 550 extend across product 510a completely covering both major sides of card 562. If desired, an additional line of scoring 560c can be provided to permit the sheet product 510a to be broken into first and second separable components 572 and 574 indicated (in phantom).

Embodiment 610a in FIG. 14 includes a removable card element 562 and a removable label 570 identical to that of FIG. 13 and further includes a third removable element, a key tag 690, with a third printed variable data field 526 bearing the same unique code as code fields 524 and 525. Key tag 690 is defined by scoring 660a, 660b. If desired, a second key tag could be formed nested with key tag 690 to provide three card and key tag identification elements. Again, individual sheet products 510a and 610a are designed so that each magnetic strip(s) and exposable adhesive layer(s) and protective release strip(s) can be laid with cover strips on a printed core to produce many side-by-side, individual sheet products at one time, either on cut sheets or continuous rolls of core material.

FIGS. 15 and 16 show other, related individual sheet product embodiments 710a and 810a. Sheet product 710a in FIG. 15 includes a removable card element 762, a removable label 770 and a removable key tag element 790 in another possible configuration. Each removable element bears a separate printed variable data field 724, 725 and 726, respectively, preferably in both character and bar formats. As is indicated, a first magnetic strip 728 is applied to span removable key tag element 790. A second magnetic strip 778 may be applied in addition or in the alternative and spans the removable card element 762. Finally, exposable adhesive layer 780 with protective release strip 782 are applied to the opposite major side of the sheet product 710a underlying the removable label 770. Cover strips 740, 750 can span the entire sheet product as indicated or portions of the product 710a including card element 762 and key tag elements 790. Individual sheet product like 710a could be made in continuous strips, side-by-side and separated by scoring after completion utilizing continuous lengths 728, 778 of the magnetic strip material and exposable adhesive layer 780 and protective release strip 782 material. Scoring 760a, 760b defines key tag 790; scoring 760c defines removable label 770 while scoring 760d defines removable card 762. Additional scoring 760e, 760e' and 760f, 760f can be provided to define removable scrap portions or elements 761, 761'. Sheet product 810a in FIG. 16 is identical to sheet product 710a of FIG. 15 but for the addition of a second removable key tag element 790' defined by scoring 760a', 760b' and bearing printed variable data field 726' and a portion of magnetic strip 728. Again, it will be appreciated that the various removable identification elements 562, 762, 790, 790' can be provided with an RFID transponder assembly 27a, etc. in place of or in addition to the indicated magnetic strip data storage element 528, 728, 778.

In addition, it will be appreciated that still other, different combinations of removable elements including combinations with multiple key tags, cards, labels, advertisements, application forms, etc. and other printed variable and static-graphic data fields can be provided in different configurations of the individual sheet products.

The uniquely, electro/magnetic encoded, identification elements of the present invention offer certain advantages over such elements which are uniquely encoded with only conventional, optically read, printed bar coding. First, they can provide greater data storage in a given area. Second, they offer the capability to rewrite some of the data being stored, so that the card can be used transactionally. Third, because they contain their own unique machine readable code, they do not actually require printed codes (e.g., 25, 125, 525, 725, 726, 726'). Such codes can, however, be useful at point of sale locations and to easily identify one unique code assigned to the individual receiving the individual sheet product. Finally, identification elements with the RF transducer assembly can be read remotely, that is without having to be physically swiped through a reader. Some systems are sufficiently powerful to be able to interrogate and respond, even without being removed from a pocket or purse, and provide even greater flexibility for customer or client identification and for financial transactions (e.g. credit and debit cards).

Figure 17:
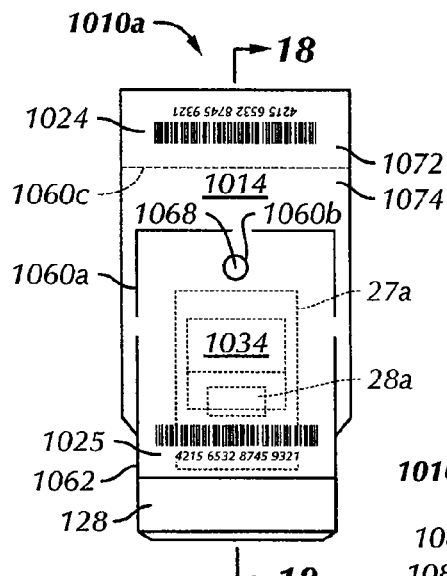
FIG. 17 is a top plan view of a tenth embodiment exemplary individual printed sheet product of the present invention.
Figure 19:
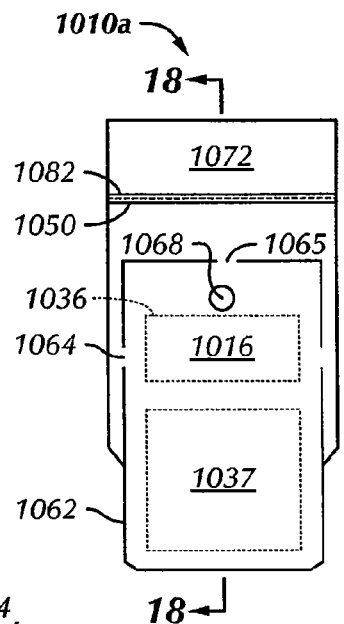
FIG. 19 is a bottom plan view of the embodiment of FIG. 17.
Figure 18:
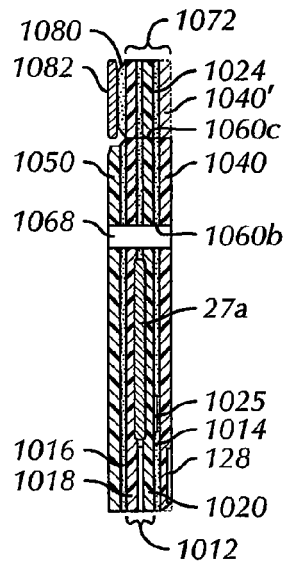
FIG. 18 is a cross section view taken along line 18-18 of FIG. 17.

FIGS. 17-19 are plan, cross sectional and opposite plan views, respectively, of a tenth embodiment, multilayer, integral, individual printed sheet product of the present invention indicated generally at 1010a. Sheet product 1010a is merely one of a number that would be produced at the same time as a collection or set as depicted in connection with FIGS. 20-21. Referring to the FIG. 18 cross section, the individual sheet product 1010a includes a planar, flexible, printable sheet core indicated generally at 1012 having opposing first and second major planar sides 1014 and 1016, a first major planar side 1014 being seen in FIG. 17 and the opposing, second major side 1016 being seen in FIG. 19. Core 1012 is provided by two plies of flexible planar polymer material, preferably first and second printable core strips 1018, 1020 which are planar, flexible and porous and accept printing. More preferably, the strips 1018, 1020 are of the microvoided, polysilicate sheet materials previously mentioned. The core strips 1018, 1020 are overlapping and coextensive in the product 1010a. Core strips 1018, 1020 can be joined together with and by any means suitable for the materials selected. Preferably, the microvoided polysilicate material strips 1018 1020 are permanently and directly bonded together with a layer 1019 of suitable adhesive material such as WC9-PL, a heat activated, water based polyurethane adhesive of the Thornley Company of Wilmington, Del. Encapsulated between the core strips 1018, 1020 is a radio frequency transponder assembly 27, which is preferably permanently and integrally fixed together with each of the core strips between the core strips 1018, 1020 in the polymer adhesive layer 1019. Again, assembly 27 includes electro/magnetic memory portion 28 (in phantom in FIG. 17) containing at least the unique electro/magnetic transponder code. Preferably, first and second cover strips 1040, 1050, are again integrally and permanently secured to the outer facing, opposing major planar sides 1014, 1016, respectively of the core 1012 and the first and second core strips 1018, 1020, respectively. Each cover strip 1040, 1050 preferably is transparent and extends at least transversely entirely across the individual sheet product 1010a on the first and second major planar sides 1014, 1016, respectively, of strips 1018, 1020 of the core 1012. At least one and, more typically, a plurality of spaced-apart, variable data fields, e.g., 1024 and 1025, are printed on the core 1012 with a unique character code which are identical to one another, namely "4215 6532 8745 9321" in this example. The variable data fields 1024, 1025 constitutes a set, each with the same unique printed code unique to the set.

Figure 20:
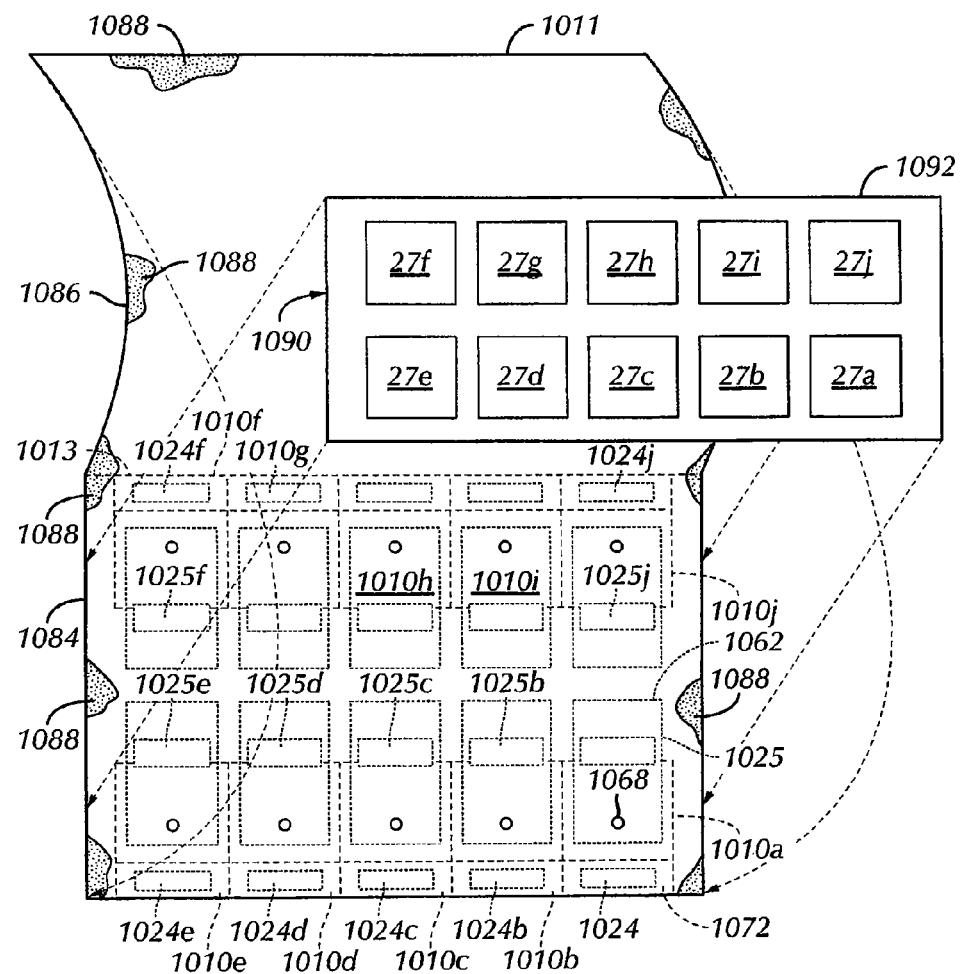
FIG. 20 is a perspective view of an initial stage of assembly of an intermediate sheet product used to make a plurality of the embodiments of FIGS. 17-19 at the same time.

Referring to FIG. 20, each other individual printed data sheet product 1010b-1010j of the collection or set of such individual sheet products has its own set of variable data fields 1024b/1025b, 1024c/1025c, etc., each coded with the same code unique to that set and different from the code of each other set of printed codes of the larger sheet product 1010 and larger collection of individual sheet products 1010a, etc., only ten of which are depicted. Again, each element may include a printed variable data field with other data unique to the set such as name and address or social security account or driver's license or passport number of the recipient. The location of the variable data fields 1024, 1025 with printed codes preferably remains the same in each individual sheet product 1010a, 1010b, etc., of the set. Only the unique code printed in the variable data fields with printed codes would change from individual sheet product 1010a to individual sheet product 1010b, etc. Again, the unique code is printed in human readable characters or numbers, or in machine readable format (e.g. bar codes) or in both formats (as depicted) in some of all of the variable data fields 1024, 1025.

In addition to the variable data fields 1024, 1025, etc., the printed sheet product 1010*a* includes one or more static graphic fields with an individual field 1034 being identified on side 1014 and with all or substantially all of the exposed side 1016 being covered by a single large static field covering or essentially covering the second major planar side 1016, which typically would be the decorated "front" side, or a plurality of individual static graphic fields as indicated in phantom at 1036, 1037. It should be appreciated that this does not preclude a static graphic field from differing in appearance from element to element as where a large overall static design is applied to blocks of the individual elements (e.g., 1010*a*-1010*j*) so no static graphic field is the same from element to element. However, such different static graphics fields carry no information unique to the card, which could be used to uniquely identify the card or the holder of the card (i.e. the person to whom the card is issued/assigned/designated. In the same way, not all printed information is variable data. The name of the entity issuing the sheet products 1010*a*, etc., which appears on all of the products, is not variable data which can be used to uniquely identify the individual issued on individual sheet product 1010*a* or 1010*b* etc.

Scoring, indicated generally at 1060*a*, 1060*b* and 1060*c*, is provided in the sheet product 1010*a* and extends at least sufficiently through and along the sheet product 1010*a* and through the core 1012 and through the first cover strip 1040 and second cover strip 1050, where present to define individual planar identification elements. Scoring 1060*a* defines at least a first integral, individual identification element 1062 removable from a remainder of the individual sheet product 1010*a*. Scoring 1060*a* and 1060*c* further separates the second printed variable data field 1025 from the other printed variable data field(s) 1024.

The first removable identification element 1062 is, again, preferably planar and multilayer in form and preferably includes at least the second printed variable data field 1025 of the plurality but only a portion of the core 1012 and core strips 1018, 1020, the first cover strip 1040, the second cover strip 1050, if provided, and the printing on the core. As depicted, cover strips 1040, 1050 extend entirely across the sheet product 1010*a* in a transverse direction but not in the longitudinal direction. At least the first cover strip 1040 could be extended as indicated in phantom at 1040' to cover the remaining printed variable data field 1024 to provide long term protection to that data field. The second cover strip could also be extended but such extension is also unneeded in this sheet product. Preferred again, one or more narrow bridges of continuous material 1064-1066 (exaggerated in length for visibility in the figures) span the scoring between the first removable element 1062 and a remainder of sheet product 1010*a* and releasably retain the first removable element 1062 in the sheet product 1010*a* until removed. Preferably, another portion 1060*b* of the scoring defines a closed perimeter opening 1068 entirely within and through the opposing major-planar sides of the first removable element 1062 to enable that element 1062 to be attached to a key ring, key case or other key holder (none depicted) as a fob. Again, element 1062 is preferably smaller in size than a conventional ISO CR-80 credit/debit/transaction card, each of which is typically about three and three-eighths inches by two and one-eighth inches in size. Identification element 1062 suggestedly but not necessarily has a length of about two and one half inches and a height of about one and five-eights inches providing a maximal diagonal dimension between opposing corners of about three inches or less (2.98"). Again, the element 1062 preferably has no dimension in the major plane of the element in a direction perpendicular to the maximum diagonal dimension greater than two inches. These dimensions make element 1062 smaller than the dimensions of a conventional ISO CR-80 size card preferably an essentially reduced size version of a standard sized credit/debit/transaction card.

The remaining line of scoring 1060*c* is preferably a line of perforations, but could be another form of a line of weakness, which extends across the individual sheet product 1010*a* and sufficiently through the core strip 1012, first cover strip 1040 and/or second cover strip 1050, where provided, to define first and second separable sheet components 1072, 1074, one of which 1072 is a second removable identification element in the form of an adhesive label bearing at least the printed first data field 1024. The remainder of portion 1074 excluding first identification element 1062 is scrap.

In addition to the radio frequency transponder assembly 27, which includes an electro/magnetic data storage element 28*a*, removable identification element 1062 is preferably provided with a magnetic strip data storage element 128 encoded with its own unique electro/magnetic code, which differs from the electromagnetic code of the magnetic strip data storage element of each other individual sheet product 1010*b*, etc. of the set. The unique code is preferably the same as the unique printed code, i.e. the code of variable data fields 1024, 1025, but may be the same as part or all of the code of the transponder assembly 27 or have both codes or have coding entirely different from each printed variable data field code and each of transponder code of the set of individual elements 1010*a*, etc.

Figure 21:
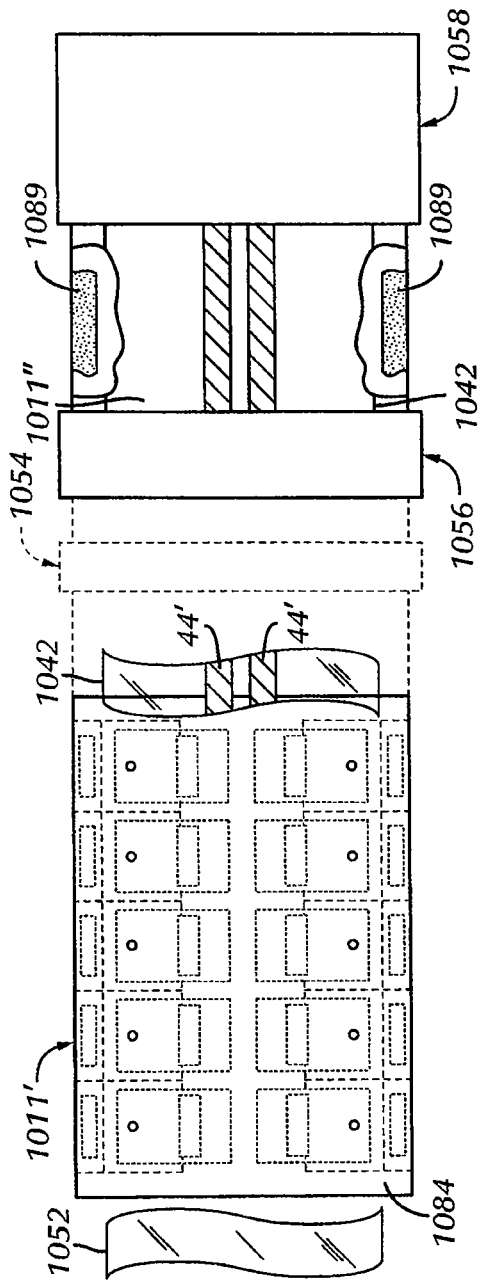
FIG. 21 is a subsequent stage of assembly using the intermediate sheet product of FIG. 20 to make the plurality of individual sheet products like that of FIGS. 17-19.

FIGS. 20 and 21 depict a suggested method of construction of plurality of the individual sheet products 1010*a*, etc., in particular 1010*a*-1010*j*. A single sheet 1011 of the preferred, microvoided, polysilicate material approximately twice the needed width, is made foldable by a line of perforations 1013 or other line of weakness along its center so as to divide the sheet 1011 into two plies or leaves 1084, 1086. The outer side of the sheet 1011, hidden in FIG. 19, is preferably preprinted with both static graphic and variable data fields before assembly. Printing on the two plies or leaves 1084, 1086 can be different or identical or may be provided on only one ply/leaf. Preferably, a suitable adhesive such as WC9-PL, identified above, is applied as a layer 1088 on the inner side sheet 1011 exposed in FIG. 20. This adhesive is tacky when dried after application but before heat activation, so that a separate sheet 1090 containing ten RFID transponder assemblies 27*a*-27*j* on a carrier 1092 such as a thin sheet of polyester, can positioned over the exposed inner side of the first leaf 1084 such that each transponder 27*a*-27*j* will lie within the interior of each of ten individual sheet products 1010*a*-1010*j*, respectively, the outlines of which are indicated in broken lines in FIG. 20. All of the RFID transponder assemblies 27*a*-27*j* in this embodiment one configured to operate at the same radio frequency. It may be desirable to individually place assemblies 27*a*-*j* etc. between the plies/leaves 1084, 1086, trimmed so as to lie well within the margins of each first removable element 1062 so that the plies/leaves 1084, 1086 can bond directly together entirely around the assemblies for each element thereby fully encapsulating the elements 27*a*-27*j* individually between the plies. This might be done automatically by scoring or perforating around each transponder 27*a*-27*j* and punching the transponders 27 from the carrier 1092 onto leaf 1084 (or 1086) with tacky exposed adhesive. The outlines of variable data fields 1024, 1024*b*, etc. and 1025, 1025*b*, etc. as well as the first removable identification element 1062 and the second removable identification element 1072 are indicated for element 1010*a* and others of the elements 1010*b*j. After the transponders 27a-27j of sheet 1090 are applied to ply/leaf 1084, the remaining, second ply/leaf 1086 is folded over onto the inner side of ply/leaf 1084 with the transferred transponders 27a-27j. The remainder of carrier 1090 can be discarded. Thereafter, as shown in FIG. 21, a first continuous transparent cover sheet 1042, portions of which become the first cover strip 1040 of each individual sheet product 1010a, etc. and a pair of separate, continuous magnetic stripes 44' preferably integral with a continuous transparent cover sheet 1042 is applied to the outer side of interim sheet product 1011' produced by the steps illustrated in FIG. 20. The outer side of ply/leaf 1084, which outer side constitute major planar side 14 of each of the individual sheet products 1010a-j, is depicted. A second continuous cover sheet 1052 may be applied to the other outer surface of interim printed sheet product 1011' (i.e. the outer side of ply/leaf 1086), which becomes the major planar side 1016 of each individual product 1010a-j. Preferably temperature activated, water based adhesives for the particular sheet materials selected are used to apply the various cover sheets 1042, 1052 (and magnetic data stripe(s), if separately applied provided). "MR", a heat activated adhesive from Transilwrap Co. of Strongsville, Ohio, can be used. The entire assembly (1011', 1042, 1052) is passed through an activator 1054, if necessary (in phantom), and rollers (one indicated at 1056) to complete lamination. Continuous carrier strips 1089, carrying the pressure sensitive adhesive forming layer 1080 and protective release strip 1082, are applied to the underside of laminated intermediate sheet product 1011". The laminated sheet product 1011" with strips 1089 is passed through a scorer 1058, which separates each individual sheet product 1010a-j from one another and from the remainder of the sheet 1011", which is scrap, and further defines the individual removable identification elements 1062, 1072, the remainder of 1074, which is also scrap, and a closed perimeter opening 1068 through each individual sheet product 1010a, etc. If the unique code stored magnetically on the magnetic data strip 1028 differs from either the printed code 1024/1025 or the RF transponder code in storage 28, it would be desirable and may be necessary to provide yet another data set on a portable data storage element like element 100 of FIG. 4 with respect to the collection of the individual sheet products 1010a et al. It has been found possible to encode magnetic strips 128 continuously applied to a continuous sheet product like 1011', 1011" before the individual removable elements are scored or removed from the continuous sheet. Equipment is currently available from Atlantic Zeiser of West Caldwell, N.J., which permits the combination of optical reading of printed bar codes (e.g. 1024, 1025 et al.) on the continuous strip product 1011" and encoding the appropriate magnetic code on the magnetic strip material 44' before the continuous sheet product 1011" passes through the scorer 1058.

Figure 22:
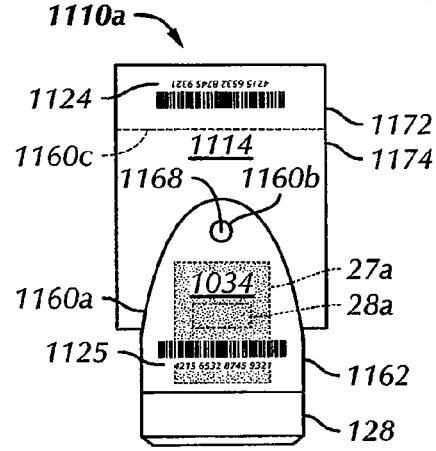
FIG. 22 is a top plan view of an eleventh embodiment exemplary individual printed sheet product of the present invention.
Figure 23:
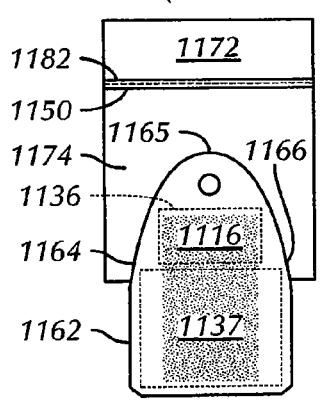
FIG. 23 is a bottom plan view of the element FIG. 22.

FIGS. 22 and 23 show opposite major planar sides of an eleventh embodiment, multilayer, integral, individual printed sheet product of the present invention indicated generally at 1110a. Sheet product 1110a is virtually identical to sheet product 1010a but for a different shape and size to the first removable identification element 1162, which is generally bullet shaped rather than rectangular like element 1062 and smaller than element 1062. Various individual features of sheet product 1110a have been numbered and correspond to those of sheet product 1010a incremented by 100. The cross section of the embodiment 1110a would be generally the same as that shown in FIG. 18 with identical components but possibly different lengths for elements 1062, 1162. Sets or collections of multiple individual sheet products 1110a, etc. would be made in the same manner of products 1010a, etc. as shown in FIGS. 20 and 21. It should be noted that the individual products 1110a, etc. can be appropriately sized and laid out on sheet of the core material such that some carrier 1090 with multiple RFID transponder assemblies 27a, etc. can be used in the manufacture of elements 1110a, etc. as well as other elements 1010a, etc.

Other shapes, in particular the generally triangular shape magnetic tags of FIGS. 7-12, can be made in the same fashion. FIG. 24 depicts a plan view of a twelfth embodiment exemplary individual printed sheet product of the present invention indicated at 1210a. This product is substantially identical to the previous products but for the shape of the base of the first removable identification element 1262, which is generally rectangular beneath a generally triangular upper portion of the element such that the lateral opposing edges 128a, 128b of the magnetic stripe 128 are substantially parallel to one another.

The material 1275 of section 1274 outside the scoring (unnumbered) defining first removable element 1262 is scrap and can be removed separately from section 1272. The RFID transponder assembly 27a is from a different manufacture and a different shape from those shown in the devices of FIGS. 17-24. However, assembly 27a has its own electro/magnetic storage element indicated diagrammatically at 28a in phantom containing a stored unique electro/magnetic code. Pluralities of such transponders 27a, each with its own, unique, stored electro/magnetic code, would be supplied in sheets similar to sheet 1090 in FIG. 20 for the production of several individual sheet products 1210a, etc. at one time. Again, a magnetic stripe 128 is provided for electro/magnetic data storage of various data including a separate unique electro/magnetic code which may or not be the same as the code stored in the assembly 27a or printed on the core at 1224, 1225, but different from each other code stored on any magnetic stripe element of any other individual sheet product (e.g. 1210b, etc.). Finally, printed unique codes 1224, 1225 are provided on each individual sheet product 1210a, etc. The printed unique code "1154" is shown only in a numeral format in variable data field 1225 but the bar code representation could be provided as well, if desired.

FIGS. 25 and 26 are plan and cross sectional views, respectively, of a thirteenth individual printed sheet product of the present invention indicated and generally at 1310a. As with embodiment 1010a of FIGS. 17-19, individual printed product 1310a has a core indicated generally at 1312, which is preferably provided in the embodiment of FIG. 26 by separate first and second flexible plies or core strips 1318, 1320 of printable material, preferably a microvoided, polysilicate material like that described previously. The two core strips 1318, 1320 are preferably joined directly together and completely around an RFID transponder assembly 1327a. Outer surfaces of the core strips 1318 and 1320 define opposing first and second major planar sides 1314, 1316, respectively of the core. Major planar side 1314 is shown in plan view in FIG. 25. At least the one major side 1314 is printed with a plurality of variable data fields 1324, 1325, 1326, each bearing the same unique printed code, in this example, 0000098. The code in each variable data field is printed in both numeral and bar formats. If desired, a first flexible preferably transparent cover strip 1340 (indicated in phantom in FIG. 26) can be integrally and permanently secured to the first side 1314 of the core 1312 by appropriate means such as an appropriate adhesive layer 1341 (also in phantom). The electro/magnetic data storage element 28a of the assembly 27a is further indicated in phantom in FIG. 25. Finally, an exposable pressure sensitive adhesive layer 1380 is applied to the major planar side 1316 of the core 1312 and core strip 1320 and is covered with a removable, protective release strip 1382, which backs the entire individual sheet product 1310a. The individual sheet product 1310a further includes scoring 1360a, 1360b, 1360c. through the core 1312 and the first cover strip 1340, if provided, to define a plurality of individual identification elements separable from one another and removable from the overall product 1310a. Preferably, scoring 1360a defines a first removable element 1362 including both the RFID transponder assembly 27a and the first variable data field 1324 with unique printed code as well as the static graphic field 1336 (indicated in phantom). Scoring 1360b defines a second removable identification element 1373 bearing a second variable data field 1325 with the unique printed code. Finally, scoring 1360c defines yet a third removable identification element 1372 bearing the third variable data field 1326 with the unique printed code. Preferably, the scoring 1360a, b, c does not extend entirely through the individual printed sheet product 1310a but stops after passage through the core 1312 or at least before cutting entirely through the removable protective strip 1382. Done in this fashion, each scoring 1360a, 1360b, 1360c can be a continuous loop. The elements 1362, 1372, 1373 are removable from the individual sheet product by peeling back a remaining portion 1374 of the individual sheet product from around each of the removable elements 1362, 1372, 1373, which then can be applied to the surface of any desired object.

FIG. 27 depicts an alternate possible construction of printed sheet product 1310a referred to as 1310a' in FIG. 27. FIG. 27 is also a view taken along the lines 26-26 in FIG. 25. In this form, individual sheet product 1310a' includes a flexible sheet core 1312' preferably formed by only a single sheet of the microvoided, polysilicate printable material previously identified. The core sheet 1312' has two opposing major planar sides, first side 1314 seen in FIG. 25 and a second side 1316'. Permanently and integrally fixed together with the second side 1316' of the core 1312' is the RFID transponder assembly 27a (with its RF responsive data storage element 28a). Finally, an exposable pressure sensitive adhesive (PSA) layer 1380 preferably is applied directly to side 1316' of the core 1312'. A removable protective release strip 1382 is applied over the PSA layer 1380. Thus, individual sheet product 1310a' is substantially identical to the construction 1310a of FIG. 26 but lacks a second core strip 1320. Scoring 1360a', 1360b', 1360c', extends only through the single layer 1318 forming core 1312' and any first cover strip 1340, if provided, to define the three removable elements 1362', 1372', 1373'.

FIG. 28 depicts the use of the removable elements of the individual sheet product 1310a of FIGS. 25-27. RFID tag 1362 is applied to one side of a conventional identification card 1300 thereby providing a machine readable, permanently stored electro/magnetic unique code to the card 1300. The other removable identification elements 1372, 1373 (and additional identical or similar elements, if desired) can be used to mark other documents used to record or to notify others of the identity of the individual who was assigned the unique electro/magnetic code.

Each of the core strips 1018, 1020 comprises and, preferably consists essentially of a porous polymer sheet material that accepts printing, more specifically at least laser printing. More preferably, one or both core strips 1018, 1020 is essentially of a sheet of porous, specifically microvoided, polymer sheet material such as Teslin® of PPG Industries, Pittsburgh, Pa., or Artisyn® of Daramic, Inc., Charleston, S.C., both microvoided, polysilicate sheet materials suitable for laser printing. Teslin® is described in detail in U.S. Pat. No. 4,861,644, incorporated by reference herein. See also published U.S. Application No. 2001 0023014 also incorporated by reference herein. Teslin® is relatively very porous with a porosity of more than fifty percent. Preferably the microvoided polysilicate materials are permanently bonded together with a layer 1019 of suitable adhesive material such as WC9-PL, a heat activated, water based polyurethane adhesive of the Thornley Company of Wilmington, Del.

As an example, RFID individual printed sheet products with removable RFID tag element with electro/magnetic unique code and magnetic stripe previously described have been made using Teslin® microvoided, polysilicate sheet, Texas Instrument Tag-it™ HF-I miniature, rectangular transponder inlays and high coercivity magnetic stripe material of JCP Enterprises Inc. of Gardnerville, Nev. The PSA coated cover strip material may be obtained from Enterprises Tape Co. of Dalton, Ill. among others. The transponders have 64 bit, factory installed unique codes and approximately 2000 bits of rewritable data storage. The magnetic stripe material successfully used with these transponders had a nominal write coercivity of 2750 Orsteads. There was no perceived interaction or interference between the magnetic stripe material (even the high coercivity material) and the transponder assembly. Each was able to be successfully read by conventional magnetic swipe and transponder interrogation units, even with the magnetic stripe at least partially overlying the RFID assembly.

The magnetic strip data storage element 128 can be of a conventionally low coercivity for writing purposes, such as about three hundred Oersted as is found on most conventional debit and credit cards, or a high write coercivity of more than one thousand Oersted, preferably more than two thousand and more preferably between about twenty-seven hundred and four thousand Oersted. Low or high coercivity magnetic strip may be obtained from various manufacturers including Green Corp Magnetics, Inc. having a business location in Havertown, Pa. or JCP Enterprises, Inc. having a business address of Gardenerville, Nev. JCP can further provide a transparent polyester cover strip with an integral low or high coercivity magnetic strip with a polyester adhesive coating on one side that can be applied directly to a core and bonded to a core by heat and pressure. Other bonding systems/steps can be used. The magnetic strip is located on the inner side of the polyester material which is only about twenty-five microns in thickness. The higher coercivity costs slightly more to provide but strongly resists demagnetization including inadvertent demagnetization by security devices commonly found in retail stores used to erase data on magnetic security devices adhered to products being sold.

The microvoided sheet material is superior to non-voided materials used in all other known examples of encasing RFID transponder assemblies in plastic tags because the material readily collapses over the assemblies when the individual sheet products are heated and pressed to laminate them without damage to the assemblies. Prior individual printed sheet products with just printed codes or printed code and magnetic stripe typically used the microvoided sheet product in a single layer ten mils thick for sufficient rigidity and resilience. Double sheet constructions like products 1010a, 1110a, 1210a and 1310a were made using seven mil thick Teslin®. The presence of the aforesaid RFID transponder assemblies in these individual sheet products with two core strips essentially could not be felt, the microvoided material essentially collapsing and possibly flowing around the assemblies where the assemblies were present between the sheets. In contrast, when bonded between sheets of conventional polymer card stock such as PVC or polyester, which lack initial porosity, a cavity has to be made to receive the RFID assembly or a distinct lump is created when the sheet(s) are(is) bonded to the RFID assembly. Also, the microvoided sheet products further bond together better than the conventional polymer sheet stock it is believed because the adhesive penetrates the porous sheet better than the conventional polymer card sheet stock, which is essentially without voids. The same is true for the outer protective polyester cover sheets and the magnetic stripe material if applied directly to the microvoided core material. Note, where outer cover sheets are bonded over the printed outerside of a core made from these preferred microporous material sheets, attempted removal of the cover sheet will tend to tear apart the core, destroying or at least distorting the printing, an added security feature. The microvoided products are "softer" and less brittle. As a result, identification elements tend not to peel, crack or break in extended use as do conventional PVC cards. This softer material transfers less pressure and stress to the transponder assemblies 27 when the removable identification elements are flexed during normal use. It has been further found that at least the preferred microvoided polymer materials affords faster static decay and is static dissipative compared with other, conventional, non-porous materials sometimes used in RFID tags and labels, including PVC, PET, and PC. This has been found to increase the range of Ultra High Frequency (UHF) transponder assemblies 27 up to about twenty percent.

The present application relates to another method of fabricating the aforesaid RFID planar elements. It has been found possible to print by silk screen, electrically conductive inks/toners on at least one microvoided polymer plastic, the aforesaid Teslin® microvoided polysilicate thermoplastic material. More particularly, at least the antenna portions of RFID transponder assemblies can be printed leaving only the transponder chip to be obtained from an outside source and applied. Chips can be obtained from the previously identified manufactures and applied automatically with "pick and place" equipment now commercially available from different manufacturers and/or distributors including but not limited to Mulbauer, a German company with a place of business in Newport News, Va. Mulbauer models TAL 4000, TMA 6000 and FCM 6000 can be considered to perform this task. The ability to silkscreen inkstoners directly on a microvided polymer material like Teslin® makes manufacture of the planar ID elements (cards, tags, labels) easier. The preexisting antenna designs and geometries supplied by RFID assembly suppliers do not always fit the desired geometry of the ID element or where they do fit, they are in relatively tight registration. Even slight misalignment can result in the die cutting of an RFID assembly or its antenna when the individual ID elements are cut from larger sheets they are made in. Being able to print antennas provides manufacturing flexibility for antenna layout and design including size, shape and frequency characteristics and scheduling because end users will no longer have to await the supply of assemblies by manufacturers, where significant delays have occurred. Furthermore, the technique of applying an entire RFID assembly previously described utilizes a bed of wet glue on the substrate to receive and hold the assembly.

Figure 29:
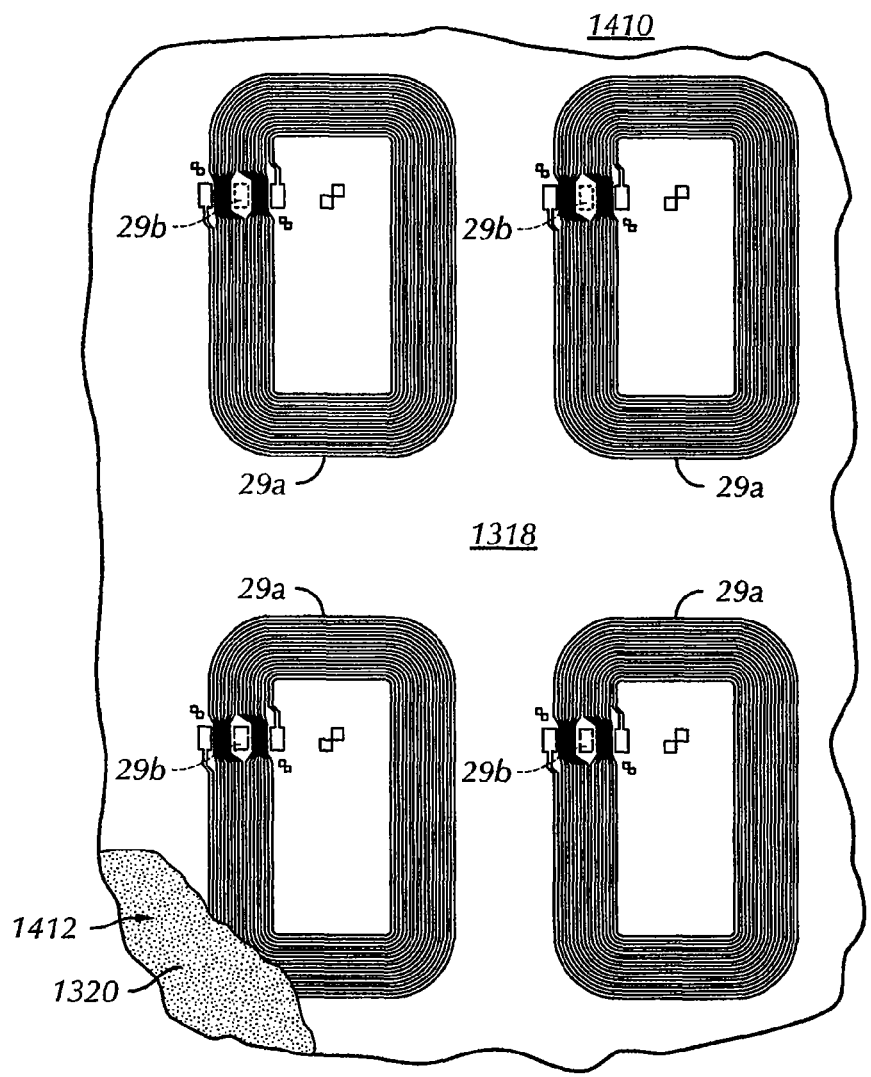
FIG. 29 depicts a plurality of exemplary antenna printed with conductive ink on a substrate forming at least part of a core.

FIG. 29 depicts a plurality of exemplary antennae 29*a* printed with conductive ink on a first major planar side of a first flexible, preferably microvoided thermoplastic substrate sheet 1318. An RFID printed circuit chip 29*b* (in phantom) for each antenna 29*a* is placed a first major planar side of a second flexible polymer plastic sheet 1320, more preferably a microvoided thermoplastic sheet, so as to align with and be operatively coupled with the printed antenna 29*a*. The second sheet 1320 is permanently and integrally attached to the first sheet 1318 encapsulating the antenna 29*a*/chip 29*b* assembly to form a planar core 1412 of a planar sheet product.

Figure 30A:
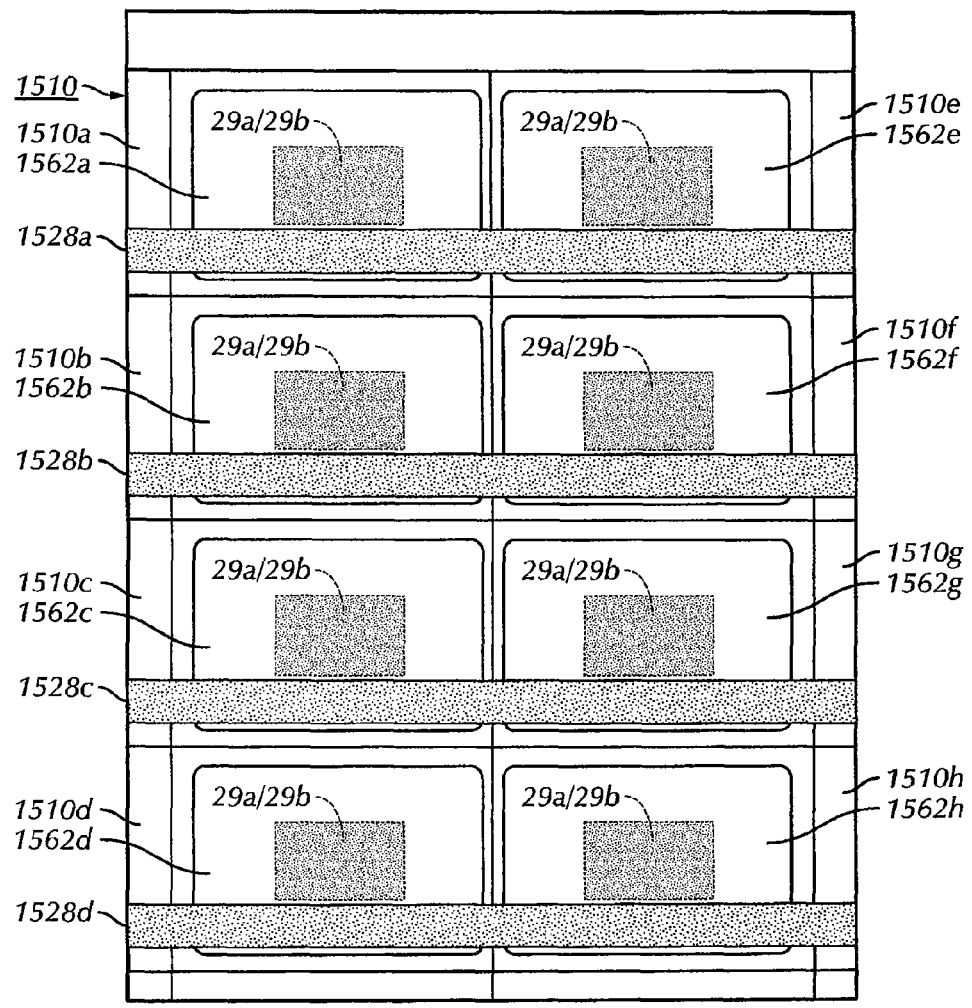
FIG. 30A depicts a possible layout for fabrication individual planar RFID identification elements in a larger printed sheet product.
Figure 30B:
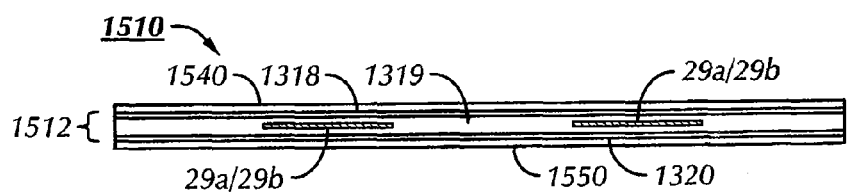
FIG. 30B is an exploded end view of the components of the printed sheet product of FIG. 30A.

FIGS. 30A-32 and 34 depict four possible layouts for fabricating planar ID elements with RFID assemblies. FIG. 30A depicts a printed planar sheet product 1510 with a plurality of individual planar printed identification elements in the form of ISO CR80 sized (about three and five eighths by about two and three eighths inch) ID cards 1562*a* et seq. with magnetic stripes 1528*a* et seq. and RFID assemblies 29*a*/29*b* (in shaded block form). FIG. 30B depicts the components of sheet product 1510 in exploded end view and includes 29*a*/29*b* RFID assemblies sandwiched between core layers 1318, 1320 permanently affixed by suitable means such as adhesive layer 1319 and transparent cover sheets 1540 and 1550. The dark interior lines in FIG. 30A depict scoring to define eight individual, rectangular printed, radio frequency identification sheet products 1510*a*-1510*h*, each with its own card element 1562*a*-1562*h* also defined by scoring.

Figure 31A:
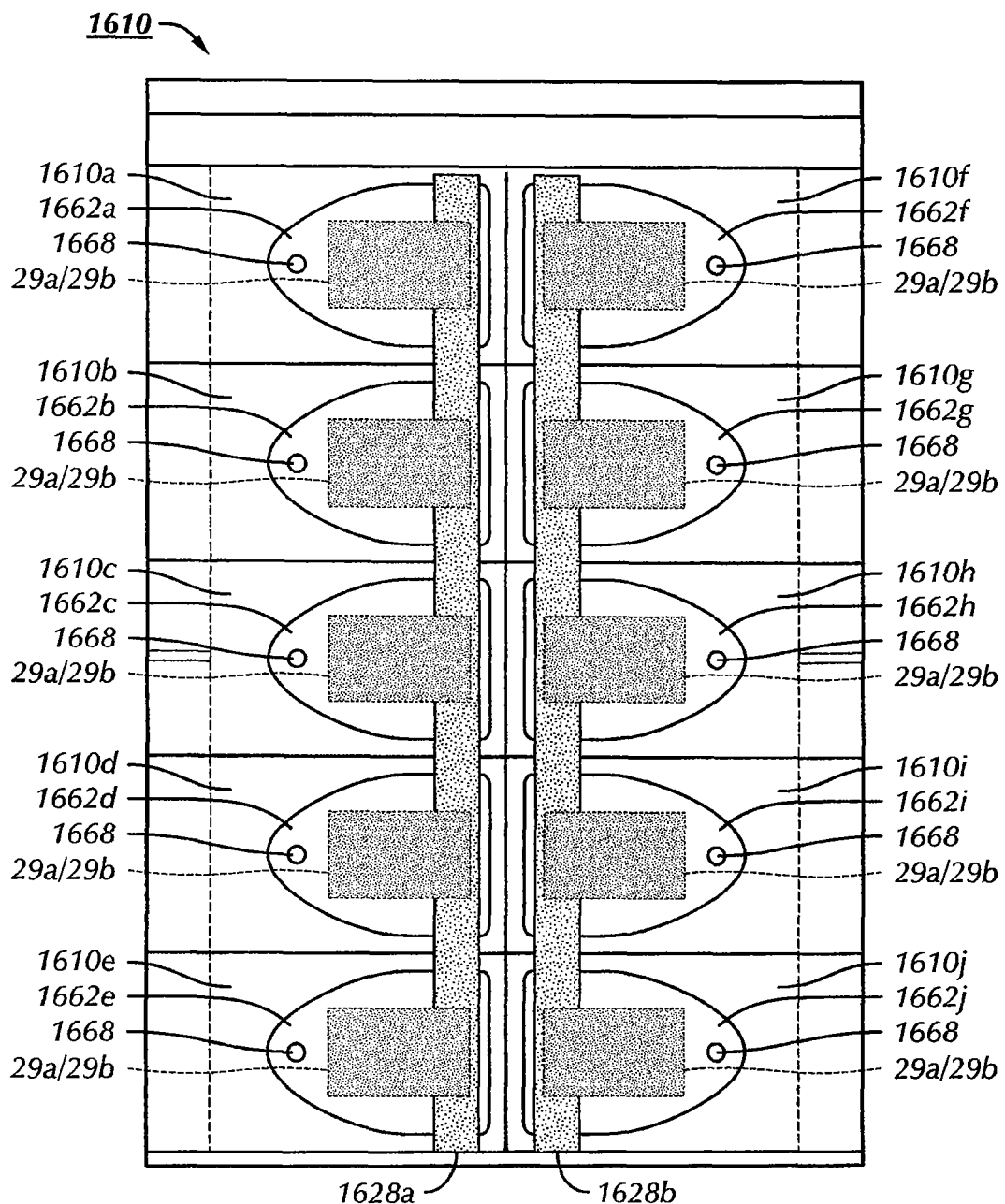
FIG. 31A depicts another possible layout for fabrication individual planar RFID identification elements in a larger printed sheet product.
Figure 31B:
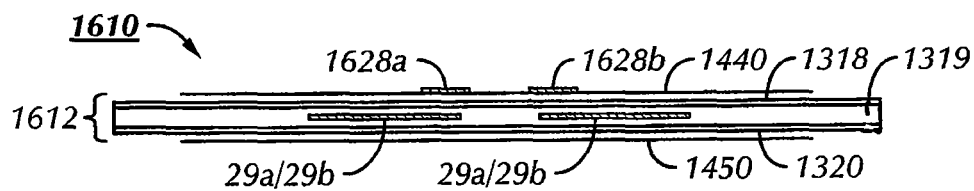
FIG. 31B is an exploded end view of the components of the printed sheet product of FIG. 31A.
Figure 32:
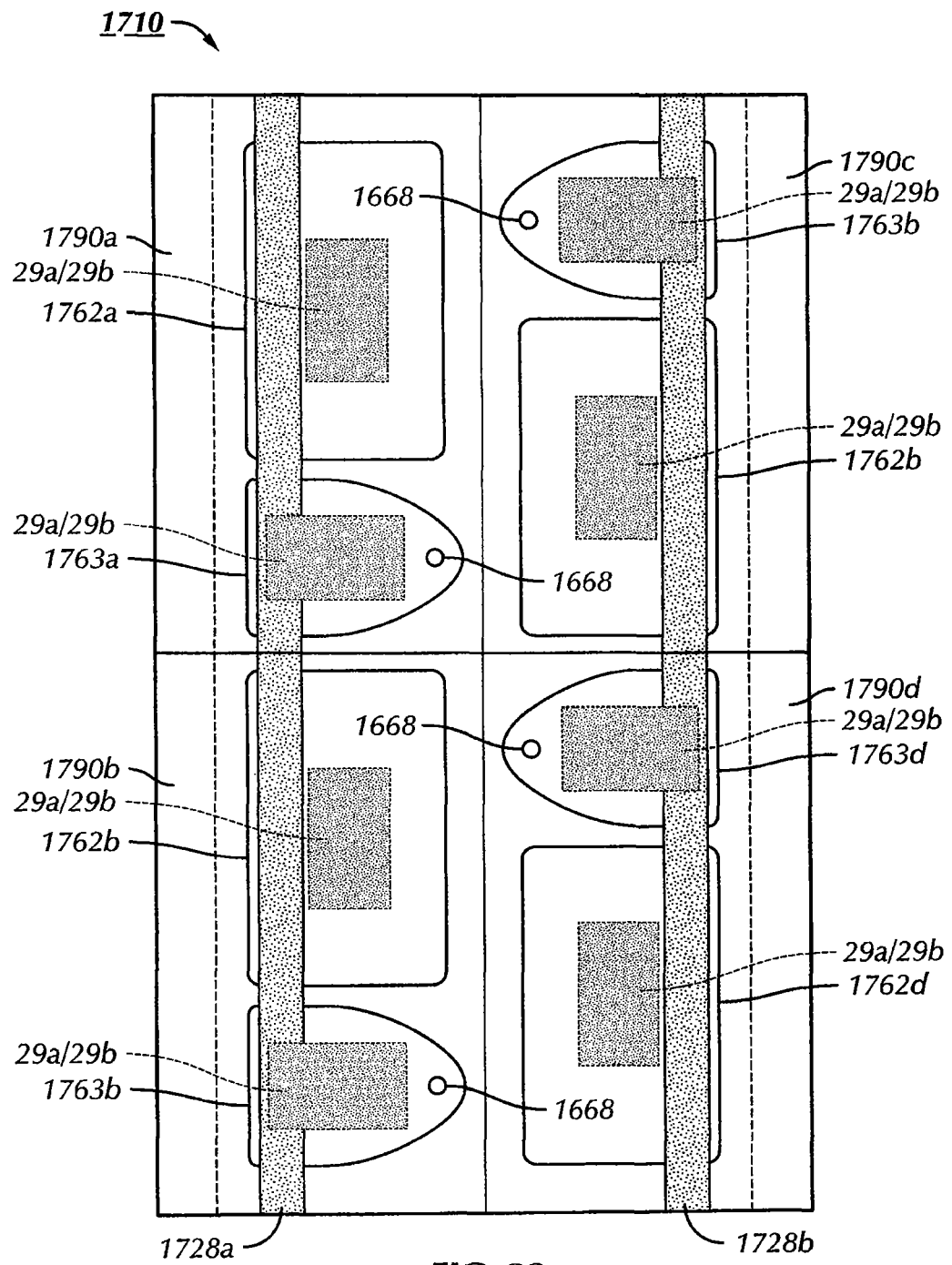
FIG. 32 depicts yet another possible layout for fabrication individual planar RFID identification elements in a larger printed sheet product.

FIG. 31A depicts a printed planar sheet product 1610 with a plurality of uniformly shaped, smaller than ISO CR80 sized ID tags 1662*a* et seq., each with a portion of a magnetic stripe 1628*a*, 1628*b*, an RFID assembly 29*a*/29*b* (in shaded block form) and a closed perimeter opening 1668 scored therethrough, enabling attachment of the element 1662*a*, 1662*b*, etc., to by receipt of a conventional key holder as a fob. FIG. 31B is an exploded end view of the sheet product 1610 showing RFID assemblies 29*a*/29*b* sandwiched by core strips 1318, 1320 forming core 1612 and transparent first and second cover strips 1440, 1450 and magnetic stripes 1628*a*, 1628*b*. FIG. 32 depicts a printed planar sheet product 1710 with a plurality of sets 1790*a*-1790*d*, each including an ISO CR80 sized ID card 1762*a*-1762*d*, respectively and a smaller than ISO CR80 sized tag 1763*a*-1763*d*, respectively, each with a portion of a magnetic stripe 1728*a*, 1728*b*. and an RFID assembly 29*a*/29*b* (in phantom block form). Sets 1790*a*, etc. are scored out of a larger cut sheet as indicated at 1710 or a continuous web printed sheet product as previously indicated. The exploded edge view of 1710 is essentially the same as 1610 in FIG. 31B except for the repositioning of magnetic stripes 1728*a*, 1728*b*. Elements 1562, 1662, 1762, 1763 would each include printing as desired, optionally including unique codes in character and/or bar format, and transparent sheet coverings on either or both major sides of the sheet material core preferably over any printing and encasing each RFID assembly.

Figure 34:
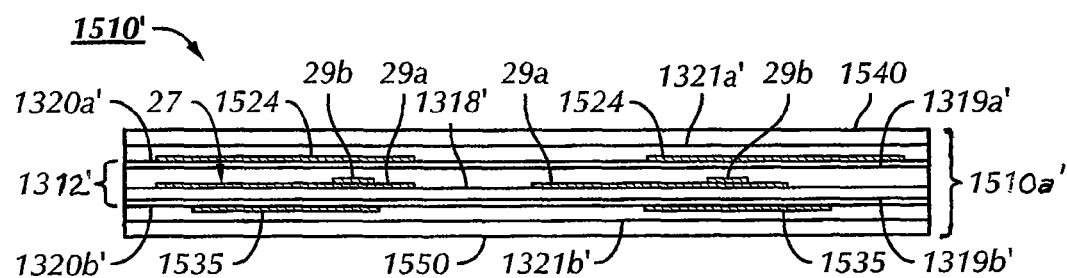
FIG. 34 is an exploded end view depicting a variation of the construction shown in FIG. 30A.

FIG. 34 depicts the components of one individual identification element 1510*a*' of a larger printed sheet product 1510' in exploded end view, a variation on the constructions shown in FIGS. 30A and 31A. Sheet product 1510' looks exactly like sheet product 1510 of FIG. 30A but has a different interior construction. Sheet product 1510' includes antenna/chip 29*a*/29*b* passive RFID transponder assemblies 27 applied to a first core layer 1318' formed by a first flexible substrate sheet bearing the same number 1318', again preferably a microvoided thermoplastic sheet 1318', which is sandwiched between overlapped plies formed by halves of a second, larger flexible substrate sheet, the opposite halves 1320*a*' and 1320*b*' of which constitute individual layers of multilayer core 1312' that are permanently affixed by suitable means such as adhesive layers 1319*a*' and 1319*b*' to opposite sides of the first sheet 1318'. Again, transparent material cover sheets 1540 and 1550 are preferably permanently affixed by suitable means such as adhesive layers 1321*a*' and 1321*b*' to opposite outer planar sides of the second sheet 1320 and core 1320'. Preferably, the outer sides of the halves 1320*a*', 1320*b*' of the second sheet 1320' are printed with static graphic fields 1535 and/or variable data fields 1524, respectively, the latter possibly including codes unique to each RFID identification element, preferably before the second sheet 1320 is folded over the first sheet 1318'. Thus, the printing is protected by the transparent cover sheets 1540, 1550 through which the printed fields are visible, while the microvoided substrate sheet(s) 1318', 1320' cushion and protect the circuiting 27 (29a/29b).

Figure 33A:
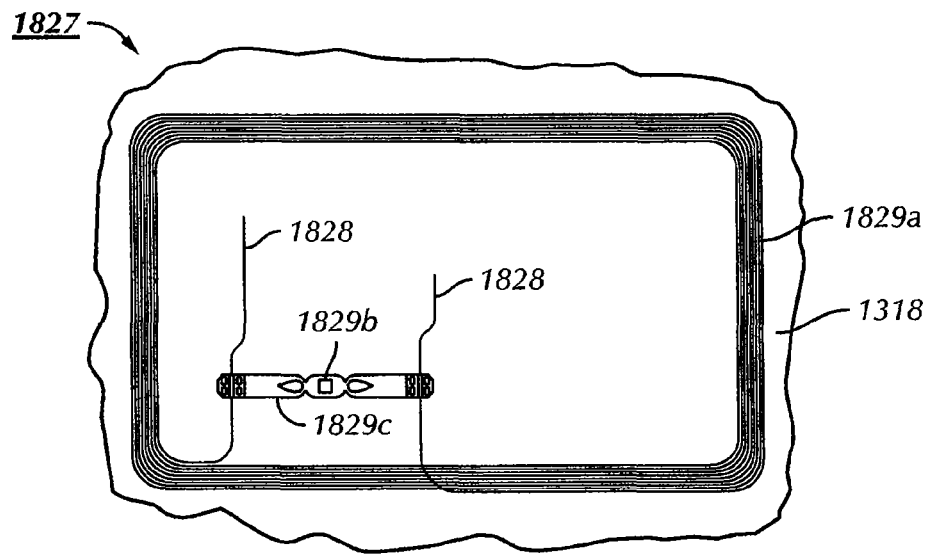
FIG. 33A depicts yet another exemplary RFID assembly.
Figure 33B:
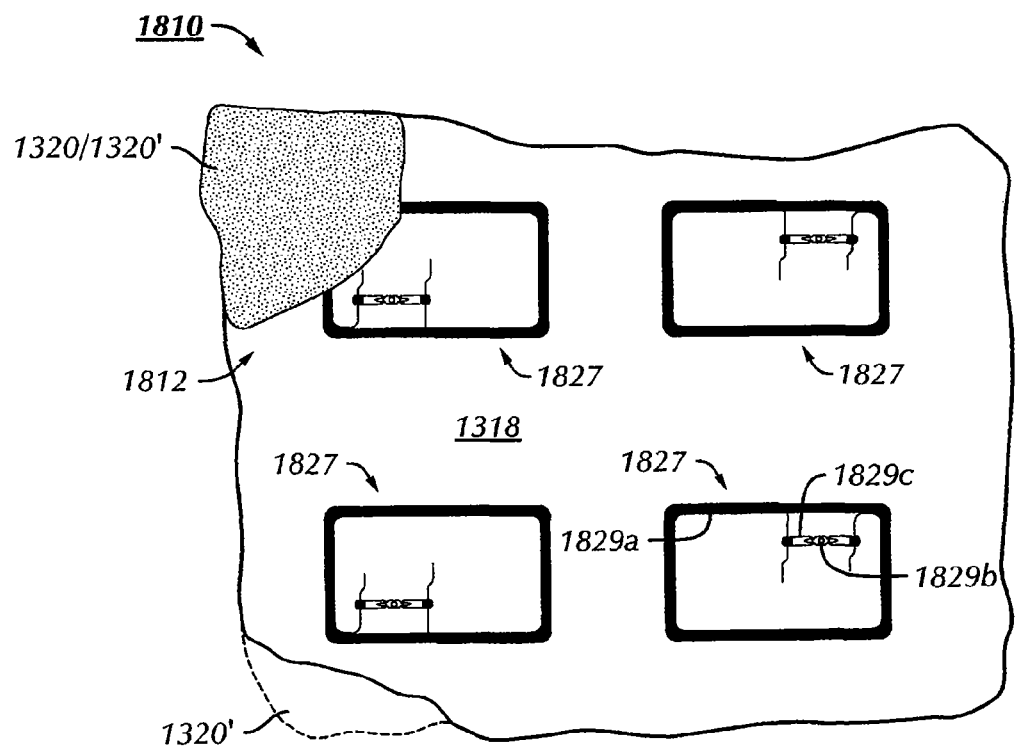
FIG. 33B depicts part of a core of a printed sheet product including a plurality of the RFID assemblies of FIG. 33A.

FIG. 33A depicts an exemplary RFID assembly 1827 including an antenna 1829a formed of extremely fine copper wire 1828 applied directly to a first major planar side of a first polymer plastic, preferably microvoided thermoplastic substrate sheet 1318, preferably around an RFID printed circuit chip 1829b on a holder 1829c spanning the ends of the wire 1828 forming the antenna 1829a. Chip 1829b is preferably previously affixed to the same first major planar side of the first sheet 1318. FIG. 33B depicts part of a printed sheet product 1810 including plurality of such assemblies 1827 all mounted on first substrate sheet 1318. A second polymer plastic sheet, preferably a microvoided thermoplastic material sheet like sheet 1320 or 1320', is permanently attached to the first sheet 1318 encapsulating the antenna/chip 1829a/1829b assemblies 1827 to form a flexible planar core 1812 of a planar sheet product 1810. Again, transparent cover sheet(s) 1540 and/or 1550 can be permanently affixed to either or both major planar sides of core 1812. Planar sheet product 1810 may take any of the forms of the sheet products 1510, 1510', 1610, 1710, etc. of FIG. 30A-32 or 34 and the individual planar identification elements thereof including but not limited to elements having major planar sides about three and five-eighths by two and three-eighths inches or less in size and being provided with magnetic stripes like 1528a et seq. and/or closed perimeter openings like 1668.

Individual planar printed radio frequency identification elements 1010 include a generally planar, high frequency (HF) or ultra high frequency (UHF), passive, radio frequency identification ("RFID") transponder assembly 27 configured to transmit an electro/magnetic signal containing a unique electro/magnetic code and, if desired, other information in response to a radiated, radio frequency ("RF") polling or interrogation signal. Referring to FIG. 29, such RFID assemblies 27 include an antenna 29a and a small chip 29b connected to the antenna. The chip 29b includes a memory (28) containing the unique electro/magnetic code, as well as transponder circuitry and a power circuit configured to temporarily store energy from the received RF polling/interrogation signal and use that energy to transmit the RF response. Such RFID assembly chips 29b also include typically volatile or programmable (random access) memory in additions to non-volatile (read-only) memory and control circuitry. The assembly 27 is preferably permanently and integrally fixed together within the core 1012 or with at least one of the core 1012 and a cover strip 1040 or 1050, if provided. The electro/magnetic transponder assembly 27 may be first "tacked" to the core 1012 before the core 1012 is joined with the cover strip 1040 or 1050, preferably, to a side of one of the core strips 1018, 1020 facing the other core strip, before those strips are joined so as to be encapsulated between the strips 1018, 1020 as shown. Such RFID assemblies 27 (also sometimes referred to as "inlays") are available from a variety of suppliers, including but not limited to, Motorola of San Diego, Calif.; Texas Instruments of Attleboro, Mass., Checkpoint Systems of Thorofare, N.J.; Gemplus Corp. of Redwood City, Calif.; Hughes Identification Devices of Tustin, Calif.; Cotag International of Wilmington, Del.; Abbhafo Incorporated of San Diego, Calif.; and Balough T.A G. of Ann Arbor, Mich. For example, Gemplus offered smart labels in three shapes: a small square approximately one-half inch square, a large square approximately one inch square and a small disk permitting their incorporation into an element 1010 only slightly larger. All three sizes come in two versions, read-only and read/write. Each read-only version contains a unique, tamperproof code of sixty-four bits, which is directly programmed during manufacture. The read/write version has a 2 kb EEPROM memory that offers different access possibilities.

It also has been found possible to print by silk screen, electrically conductive inks/toners on at least one microvoided polymer plastic, the aforesaid Teslin® microvoided polysilicate thermoplastic material. More particularly, at least the antenna portions 29a of RFID transponder assemblies 27 can be printed leaving only the transponder chip 29b to be obtained from an outside source and applied. The chip 29b may be mounted on a holder (not depicted) to span the antenna 29a. Chips can be obtained from the previously identified manufacturers and applied automatically with "pick and place" equipment now commercially available from different manufacturers and/or distributors including but not limited to Mulbauer, a German company with a place of business in Newport News, Va. Mulbauer models TAL 4000, TMA 6000 and FCM 6000 can be considered to perform this task. The ability to silkscreen inks/toners directly on a microvided polymer sheet material layer 1018 or 1020 like Teslin® makes manufacture of the planar ID elements easier. The preexisting antenna designs and geometries supplied by RFID assembly suppliers do not always fit the desired geometry of the ID element or where they do fit, they may be in relatively tight registration. Even slight misalignment can result in the die cutting of an RFID assembly or its antenna when the individual ID elements are cut from larger sheets they are made in. Being able to print antennas provides manufacturing flexibility for antenna layout and design including size, shape and frequency characteristics and scheduling because end users will no longer have to await the supply of assemblies by manufacturers, where significant delays have occurred. Furthermore, the technique of applying an entire RFID assembly previously described utilizes a bed of wet adhesive on the substrate to receive and hold the assembly.

Figure 35:
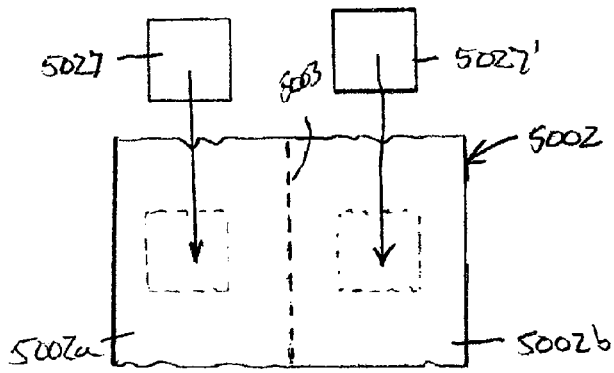
FIGS. 35-37 depict the fabrication of another embodiment of the invention.
Figure 36:
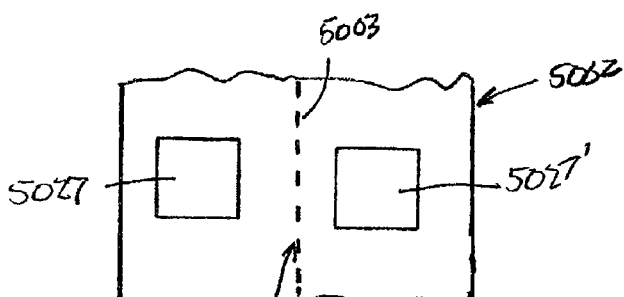
Figure 37:
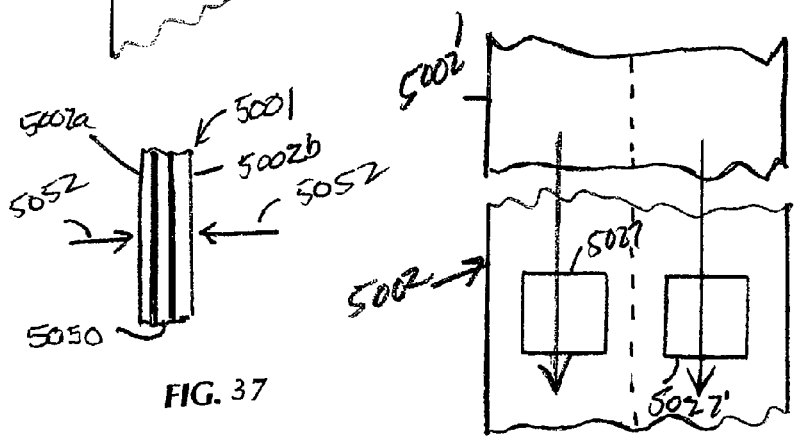

FIGS. 35-37 depict diagrammatically, the steps in producing yet another form of planar radio frequency identification ("RFID") element 5000 with two different planar radio frequency transponder assemblies. There are applications in which both High Frequency (HF) and Ultra High Frequency (UHF) passive RFID transponder assemblies or "inlays" would be provided as an identification element such as one used as a wristband to facilitate various applications such as Ticket-less access control, locker access control, vending machines and self service Kiosks. High frequency (HF) assemblies are relatively short ranged (i.e. inches) and so are useful for financial transactions. Ultra High Frequency (UHF) "Inlays" have a longer range (e.g. tens of feet) for longer range applications such as interactive people locating. All of this could be achieved by using one dual frequency identification element.

Figure 38:
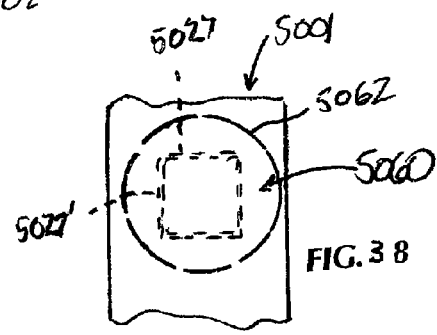
FIG. 38 is a side elevation of the planar radio frequency identification ("RFID") element with planar radio frequency transponder assemblies resulting from FIGS. 35-37.

Referring to FIG. 35, a Teslin or like microporous polymer sheet web 5002 is provided on which a UHF RFID assembly 5027 is positioned on a one side (left side in figure) and an HF RFID assembly 5027' is positioned on a another side (right side in figure) proximal the first assembly 5027. The assemblies can be temporarily tacked in place with a contact adhesive. After the assemblies 5027, 5027' are positioned on the opposite sides ("halves") 5002a, 5002b of the web 5002, the web is folded over at the "hinge" 5003 provided, for example, by prior provided perforation or other line of weakness down the web 5002 between (i.e. generally equidistant) from the two assemblies 5027, 5027'. In FIG. 36, an adhesive layer preferably in the form of an adhesive sheet 5050 is inserted between the opposite sides/halves and heat and pressure (arrows 5052 in FIG. 36) is applied to bond the halves 5002*a*, 5002*b* together encapsulating the two assemblies 5027, 5027' and the adhesive layer/sheet 5050 between the two plies 5002*a*/5002*b* of the web 5002. The resulting, intermediate multilayer core sheet product is identified as 5001 in FIGS. 37 and 38. The adhesive sheet 5050 will separate the two different frequency RFID assemblies 5027, 5027' in the multilayer core sheet product 5001. The product 5001 is scored (preferably by die cutting) as at 5062 to define an RFID element 5060 removable or otherwise removed from a remainder of the multilayer core sheet product 5001, having two separate RFID assemblies 5027, 5027' operating at first and second, different radio frequencies.

A cover sheet in the form of a preferably transparent, thin film lamination (e.g. PE not depicted) may or may not be applied to either outer side (or to both sides) to protect the surface(s). For an element to be worn, for example in a wristband, a layer of foam material is suggested located between the wearer's skin and the facing side (inside) of the element 5060 (or a wristband with the element), thereby putting distance between the UHF RFID assembly and the skin of the user to enhance the propagation of the RFID signals. UHF RFID tags read at a longer range when the tags are spaced away from liquids (i.e. spaced from the sweaty skin of someone wearing the element 5060, for example, in a wrist band). Various foam materials with pressure sensitive adhesives/liners are available commercially through many vendors. The sheet 5001 can be scored itself to form the body of the wristband with the embedded assemblies.

Figure 39:
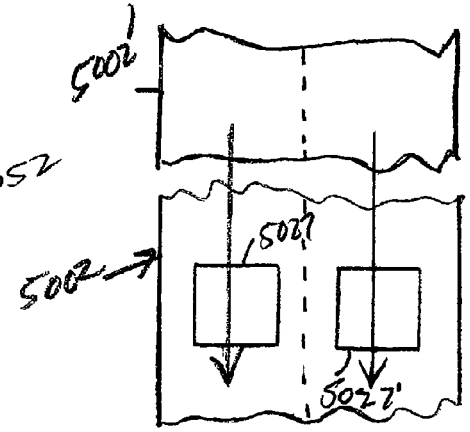
FIG. 39 shows a slightly different alternative construction.

If desired, another polymer layer 5002' (FIG. 39), preferably another integral Teslin sheet web, may be positioned or otherwise located over the positioned assemblies 5027, 5027' and first web 5002 and the assemblies encapsulated by being hermetically sealed between the webs 5002, 5002'. The webs 5002, 5002' could be individual sheets, separate webs or even a single web or sheet folded approximately in two so as to overlap one another. The adhesive sheet 5050 would then be inserted between the opposing sides of the resulting sandwich to provide an assembly with five polymer sheet layers and two RFID assemblies (not depicted). Alternatively, adhesive sheet 5050 could be replaced with an adhesive layer resulting in an element having a core formed by four polymer sheets or plies to which cover sheets might be added to either of both major sides for protection.

Other specific manufacturing details and materials, including suggested materials and manufacturing techniques, as well as other configurations of printed sheet products including planar, printed identification elements have been disclosed in prior U.S. Pat. Nos. 4,978,146, 5,495,981 5,743,567, 5,769,457, 5,863,076, 6,010,159, 6,769,718, 7,204,652 and/or 6,039,356, and Application Nos. 60/882,623 filed Dec. 29, 2006, Ser. No. 09/595,825 filed Jun. 16, 2000, each of which is incorporated by reference herein in its entirety.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:

1. A method of making a multilayer, integral, individual planar radio frequency identification element comprising the steps of:
    encapsulating at least a first passive radio frequency identification transponder assembly between two plies of flexible porous planar polymer material intimately bonded together around the assembly, each ply being microvoided substantially uniformly throughout, to form a multilayer planar core; and
    scoring the multilayer core to define at least a first multilayer, integral, individual planar radio frequency identification element including the first passive radio frequency identification transponder assembly separable from a remainder of the core.

2. The method of claim 1 further comprising before the encapsulating step, a step of providing microvoided, polysilicate material as the two plies of flexible porous planar polymer material.

3. The method of claim 2 wherein the providing step further comprises supplying a single sheet of the polysilicate material processed to fold upon itself to define the two plies.

4. The method of claim 2 further comprising the step of printing on at least one major side of at least one of the two plies such that the printing is exposed on the multilayer planar core and wherein the scoring step includes scoring the multilayer planar core such that at least some of the printing is included on the multilayer, integral, individual planar radio frequency identification element.

5. The method of claim 4 where the printing on the multilayer, integral, individual planar radio frequency identification element includes a first code unique to the element.

6. The method of claim 1 wherein the scoring step comprises scoring the first multilayer, integral, individual planar radio frequency identification element in an ISO CR-80 size or smaller such that opposing major planar sides of the first element have areas of three and five-eighths by about two and three-eighths inches or less.

7. The method of claim 6 wherein the scoring step further comprises scoring the first multilayer, integral, individual planar radio frequency identification element from the remainder of the core in a smaller than ISO CR-80 size and with a closed perimeter opening through opposing major planar sides of the first element.

8. The method of claim 1 wherein the encapsulating step comprises simultaneously encapsulating between the two plies at least a second, passive radio frequency identification transponder assembly separate from the first assembly.

9. The method of claim 8 wherein the first and second passive radio frequency identification transponder assemblies operate at the same radio frequency and wherein the scoring step further comprises scoring the multilayer core to form a second multilayer, integral, individual planar radio frequency identification element including the second passive radio frequency identification transponder assembly, the second element being separable from the first multilayer, integral, individual planar radio frequency identification element and from a remainder of the core.

10. The method of claim 9 where the second multilayer, integral, individual planar radio frequency identification element includes a second printed code different from the first printed code and unique to the second element.

11. The method of claim 8 wherein first passive radio frequency identification transponder assembly operates at a first radio frequency and the second passive radio frequency identification transponder assembly operates at a second radio frequency different from the first radio frequency and wherein the scoring step further comprises scoring the multilayer core to include the second passive radio frequency identification transponder assembly in the first multilayer, integral, individual planar radio frequency identification element.

12. The method of claim 11 wherein the encapsulating step further comprises encapsulating at least another polymer layer between the two plies and between the first and second transponder assemblies in the multilayer planar core.

13. The method of claim 12 wherein the other polymer layer comprises an adhesive material.

14. The method of claim 12 wherein the other polymer layer comprises an integral polymer sheet.

15. The method of claim 14 wherein the integral polymer sheet is of a microvoided material having a porosity greater than fifty percent.

16. The method of claim 12 wherein the encapsulating step further comprises encapsulating at least two additional polymer material plies between the two plies and between the first and second transponder assemblies in the multilayer planar core.

17. A method of making a multilayer, integral, individual planar radio frequency identification element comprising the steps of:
encapsulating at least a first passive radio frequency identification transponder assembly between at least first and second layers of flexible planar polymer sheet materials bonded together around the assembly to form an integrally bonded, multilayer planar core, at least the first layer being microvoided substantially uniformly throughout; and
scoring the multilayer core to define at least a first multilayer, integral, individual planar radio frequency identification element including the first passive radio frequency identification transponder assembly separable from a remainder of the core.

18. The method of claim 17 further comprising before the encapsulating step, a step of providing as the first layer, a microvoided sheet material having a porosity greater than fifty percent.

19. The method of claim 18 wherein the providing step further comprises providing as the second layer, the same microvoided sheet material as the first layer having a porosity greater than fifty percent.

20. The method of claim 19 wherein the providing step further comprises supplying a single sheet of the microvoided sheet material processed to fold upon itself to define the first and second layers.

21. The method of claim 18 further comprising the step of printing on at least one major side of at least one of the layers of the multilayer core such that the printing is exposed on the multilayer planar core and wherein the scoring step includes scoring the multilayer planar core such that at least some of the printing is included on the first multilayer, integral, individual planar radio frequency identification element.

22. The method of claim 21 where the printing on the first multilayer, integral, individual planar radio frequency identification element includes at least a first code unique to the first multilayer, integral, individual planar radio frequency identification element.

23. The method of claim 17 wherein the encapsulating step comprises simultaneously encapsulating between the first and second layers at least a second, passive radio frequency identification transponder assembly separate from the first assembly.

24. The method of claim 23 wherein the first passive radio frequency identification transponder assembly operates at a first radio frequency and the second passive radio frequency identification transponder assembly operates at a second radio frequency different from the first radio frequency and wherein the scoring step further comprises scoring the multilayer core to include the second passive radio frequency identification transponder assembly in the first multilayer, integral, individual planar radio frequency identification element with the first passive radio frequency identification transponder assembly.

25. The method of claim 24 wherein the encapsulating step further comprises encapsulating at least a third layer of a flexible planar polymer material between the first and second layers of flexible planar polymer materials so as to separate the first and second transponder assemblies from one another in the multilayer core.

26. The method of claim 25 wherein the encapsulating step further comprises bonding each of the first and second layers directly to the third layer such that the first and second layers are intimately bonded to one another through the third layer.

27. The method of claim 25 wherein the encapsulating step further comprises encapsulating at least a fourth layer of a flexible planar polymer material between the first and second layers, the third and fourth layers being formed by a single sheet of flexible planar polymer material processed to fold upon itself to define the third and fourth layers.

28. The method of claim 23 wherein the first and second passive radio frequency identification transponder assemblies operate at the same radio frequency and wherein the scoring step further comprises scoring the multilayer core to form a second multilayer, integral, individual planar radio frequency identification element including the second passive radio frequency identification transponder assembly, the second element being separable from the first multilayer, integral, individual planar radio frequency identification element and from a remainder of the core.

* * * * *